(12) United States Patent
Mansour et al.

(10) Patent No.: US 7,842,110 B2
(45) Date of Patent: Nov. 30, 2010

(54) STEAM REFORMING PROCESS AND APPARATUS

(75) Inventors: Momtaz N. Mansour, Highland, MD (US); Ravi Chandran, Ellicott City, MD (US)

(73) Assignee: Thermochem Recovery International, Inc., Baltimore, MD (US)

(*) Notice: Subject to any disclaimer, the term of this patent is extended or adjusted under 35 U.S.C. 154(b) by 1262 days.

(21) Appl. No.: 10/659,725

(22) Filed: Sep. 10, 2003

(65) Prior Publication Data

US 2004/0182000 A1 Sep. 23, 2004

Related U.S. Application Data

(60) Provisional application No. 60/409,683, filed on Sep. 10, 2002.

(51) Int. Cl.
| | |
|---|---|
| *C01B 3/36* | (2006.01) |
| *C10J 3/46* | (2006.01) |
| *C10J 3/54* | (2006.01) |
| *C10J 3/16* | (2006.01) |
| *B01J 7/00* | (2006.01) |
| *B01J 8/18* | (2006.01) |
| *F27B 15/00* | (2006.01) |

(52) U.S. Cl. ............... 48/197 R; 48/61; 48/202; 422/139; 422/141; 422/142

(58) Field of Classification Search ........... 423/652; 48/94, 111, 197 R, 209, 214, 197 FM, 61; 422/139, 140, 142, 190, 141
See application file for complete search history.

(56) References Cited

U.S. PATENT DOCUMENTS

| | | | | |
|---|---|---|---|---|
| 2,680,065 A | * | 6/1954 | Atwell | ............... 48/202 |
| 4,097,361 A | * | 6/1978 | Ashworth | ............... 208/408 |
| 4,300,916 A | * | 11/1981 | Frewer et al. | ............... 48/210 |
| 4,522,685 A | * | 6/1985 | Feldmann | ............... 162/30.11 |
| 5,059,404 A | | 10/1991 | Mansour et al. | |
| 5,133,297 A | | 7/1992 | Mansour | |
| 5,197,399 A | | 3/1993 | Mansour | |
| 5,205,728 A | | 4/1993 | Mansour | |
| 5,211,704 A | | 5/1993 | Mansour | |
| 5,255,634 A | | 10/1993 | Mansour | |

(Continued)

FOREIGN PATENT DOCUMENTS

EP 641884 A1 * 3/1995

OTHER PUBLICATIONS

Article—*Here are ways to increase sulfer processing capability*, Charles L. Kimtantas, Oil & Gas Journal, Technology, Refining, May 22, 1989, 12 pages.

(Continued)

*Primary Examiner*—Alexa D Neckel
*Assistant Examiner*—Matthew J Merkling
(74) *Attorney, Agent, or Firm*—Womble Carlyle

(57) ABSTRACT

Various processes and systems are disclosed for converting carbonaceous materials into a product gas stream. For instance, the product gas stream may be endothermically converted to a gas through a steam reforming process. The present invention is directed to various methods and systems for increasing throughput and efficiency of the system. Further, the present invention is also directed to sulfur removal methods and systems from a gas stream.

32 Claims, 12 Drawing Sheets

U.S. PATENT DOCUMENTS

| | | | |
|---|---|---|---|
| 5,306,481 A | 4/1994 | Mansour et al. | |
| 5,353,721 A | 10/1994 | Mansour et al. | |
| 5,364,610 A | 11/1994 | Merris, Jr. | |
| 5,366,371 A | 11/1994 | Mansour et al. | |
| 5,514,351 A | 5/1996 | Buchanan et al. | |
| 5,536,488 A | 7/1996 | Mansour et al. | |
| 5,624,470 A * | 4/1997 | Tanca | 48/7 |
| 5,637,192 A | 6/1997 | Mansour et al. | |
| 5,638,609 A | 6/1997 | Chandran et al. | |
| 5,752,994 A * | 5/1998 | Monacelli et al. | 48/111 |
| 5,842,289 A | 12/1998 | Chandran et al. | |
| 6,149,765 A | 11/2000 | Mansour et al. | |
| 6,548,197 B1 | 4/2003 | Chandran et al. | |
| 2004/0031450 A1 | 2/2004 | Chandran et al. | |

OTHER PUBLICATIONS

Paper—*Modified Claus Process with Tailgas Cleanup*, Ortloff Engineers, Ltd., 1999, 7 pages.

* cited by examiner

Figure 3. Spent Liquor Recovery Options

Figure 10 Steam Reforming Co-generation

Figure 11 Steam Reformer Island

STEAM REFORMING PROCESS AND APPARATUS

RELATED APPLICATIONS

The present application is based on and claims priority to a U.S. Provisional Application filed on Sep. 10, 2002, having U.S. Ser. No. 60/409,683.

BACKGROUND OF THE INVENTION

Combustion is the oldest process employed by mankind for the conversion of energy from a variety of solids and liquid carbonaceous and hydrocarbon materials. The energy content of such materials is converted into heat that in turn is used for a number of energy applications (heating, cooling, power generation, propulsion, etc.).

Only recently, partial oxidation of certain solid and liquid materials has been pursued to make fuel gases that could in turn be used by advanced energy conversion technologies such as Gas Engines (GEs), Gas Turbine Combined Cycle (GTCC) plants and ultimately, in the future, fuel cells. Partial oxidation may provide enhanced thermal efficiencies and significantly reduced pollution performance of the process while enhancing the economics. In partial oxidation, the material is burned with less oxygen than what is required to achieve complete combustion. The energy in the material is released as sensible heat as well as energy content of combustible gases and condensable hydrocarbon products. The ratio between the amount of sensible heat in the product gas to cold product gas calorific value is typically significant since partial oxidation is primarily an incomplete combustion process.

In contrast to combustion and partial oxidation, pyrolysis typically is carried out at a lower temperature and in the absence of air or other oxidants. Pyrolysis is similar to destructive distillation in which gaseous fuels and a significant amount of vapors of liquid hydrocarbons can be derived from the feedstock. In pyrolysis, the carbon conversion is relatively low and the tar yield is relatively high.

Another method for converting carbonaceous materials into a fuel source is through endothermic conversion, such as by using steam reforming reactions. For example, various indirectly heated steam reforming processes are disclosed in U.S. Pat. No. 5,059,404, U.S. Pat. No. 5,133,297, U.S. Pat. No. 5,306,481, U.S. Pat. No. 5,536,488, and U.S. Pat. No. 6,548,197, which are all incorporated herein by reference. In the above patents, a fluidized bed may be heated, for instance, by a pulse combustor. Other patents which describe the use of a pulse combustor include U.S. Pat. No. 5,197,399, U.S. Pat. No. 5,205,728, U.S. Pat. No. 5,211,704, U.S. Pat. No. 5,353,721, U.S. Pat. No. 5,366,371, U.S. Pat. No. 5,638,609, and U.S. Pat. No. 5,842,289 which are also herein incorporated by reference. The steam reforming systems and processes disclosed in the above patents represent great advancements made in the art of treating carbonaceous materials; such as black liquors produced in the pulp and paper industry, coal, other biomass materials, and the like. Indirectly heated steam reforming processes offer low temperatures for the production of gaseous fuels consistent with a satisfactory level of carbon conversion and sulfur reduction. The present invention, however, is directed to further improvements in endothermic reforming processes.

SUMMARY OF THE INVENTION

The present invention is generally directed to processes and systems for converting carbonaceous materials into useful products. For instance, in one embodiment, the carbonaceous materials undergo a steam reforming process producing significant amounts of hydrogen. The hydrogen then may be used as a fuel source in, for instance, a fuel cell or a gas turbine to produce electricity.

In one embodiment, the feedstock that is fed to the process comprises a liquid or a slurry and may, in one example, be spent black liquor. In order to increase throughput and efficiency of a steam reforming process in accordance with the present invention, the feedstock is at least partially dried prior to entering a steam reforming fluidized bed. In particular, the carbonaceous fluid is dried so as to have a solids content of at least 80%, and particularly at least 90%. For example, in one embodiment, the carbonaceous fluid is dried to a solids content of at least 95%. Once dried, the carbonaceous material is injected into an indirectly heated fluidized bed. The fluidized bed contains particles suspended in a fluid medium. In the bed, the carbonaceous material is endothermically converted into a product gas.

The fluidized bed, in one embodiment, may be indirectly heated by at least one pulse combustion device. The pulse combustion device creates a pulsating combustion stream and an acoustic pressure wave that are transmitted through at least one resonance tube inserted into the fluidized bed. The fluidized bed may be maintained at a temperature, for instance, of from about 1100 degrees F. to about 1300 degrees F. In one particular embodiment, for instance, the fluidized bed is maintained at a temperature of less than about 1150 degrees F.

The dried carbonaceous materials are injected into the fluidized bed with an average particle size, a particle size distribution, and a solids concentration such that the carbonaceous material forms a molten layer on the fluidized bed particles prior to being converted into a gas. In this manner, the formation of excessive fines are reduced. Further, by ensuring that the carbonaceous material coats the bed materials, greater carbon conversion is achieved. The carbonaceous material may be injected into the fluidized bed in a carrier gas, such as steam or by using the product gas itself. In other embodiments, however, the carbonaceous material is screw fed into the bed.

Any suitable drying device may be used to dry the carbonaceous material. In one embodiment, for instance, the carbonaceous fluid is fed to an evaporator and then to a second fluidized bed prior to entering the first fluidized bed where steam reforming occurs. The use of a fluidized bed in order to dry the carbonaceous material may be desired in some applications due to the ability of the bed to separate fines from larger particles. In other embodiments, however, other suitable drying devices may be used. When other drying devices are used, the system may need a particle classifier or screen to ensure that the proper particle sizes are entering the fluidized bed. In general, the particle size of the carbonaceous material entering the bed can be from about 45 microns to about 120 microns.

In another embodiment, the present invention is directed to a process for producing a gas having heat or fuel value. According to the process, a carbonaceous material is fed to a first fluidized bed. The fluidized bed is indirectly heated with a combustion device, such as a pulse combustion device. In this embodiment, the fluidized bed is maintained at a temperature of less than about 1200 degrees F. in order to increase throughput. Decreasing the temperature of the bed, however, may cause the accumulation of carbon particles in the bed. In this regard, the process further includes the step of extracting bed solids containing carbon from the first fluidized bed and feeding the extracted solids to a second fluidized bed. The second fluidized bed acts as a carbon trim cell and partially oxidizes the carbon in conjunction with steam reforming reactions. For instance, the second fluidized bed may include a fluidizing medium comprising steam and an oxygen containing gas, such as air. Due to the oxidation of the carbon particles, the second fluidized bed is maintained at a temperature higher than the first fluidized bed.

Ultimately, a second product gas stream is emitted from the second fluidized bed which may be used as desired. For example, in one embodiment; the second product gas stream may be combined with the first product gas stream.

The amount of oxygen fed to the second fluidized bed depends upon the particular application. For most applications, for instance, the fluidizing medium contains oxygen in a stoichiometric amount of less than about 50% based upon the amount of carbon in the bed. In other applications, the amount of carbon fed to the fluidized bed may range from about 20% to about 50% of the stoichiometric amount.

As described above, the second fluidized bed receives extracted bed solids for converting leftover carbon. In an alternative embodiment, however, a carbon gasification device may be incorporated directly into the first fluidized bed. For instance, in an alternative embodiment, the fluidized bed may include a top portion and a bottom portion. The bottom portion may be in communication with a solids collection reservoir, such as a bed drain nozzle. In accordance with the present invention, a gas containing oxygen is fed through the solids collection reservoir for oxidizing at least a portion of the carbon contained within the reservoir. In one embodiment, the oxygen containing gas may be combined with steam to permit steam reforming reactions to occur as well.

The above embodiments may be used alone or in conjunction with one another in order to increase the throughput rate and/or the efficiency of the steam reforming apparatus. The present invention, however, is also directed to various processes for removing sulfur compounds from the product gas that is produced in the steam reformer. For example, in one embodiment, a process for removing hydrogen sulfide from a product gas stream includes the steps of contacting the gas stream with an aqueous solution containing sodium carbonate. The hydrogen sulfide reacts with the sodium carbonate to form a sodium sulfide, such as sodium sulfide or sodium bisulfide, and sodium bicarbonate. The sodium carbonate contained in the aqueous solution is at a concentration sufficient to cause the sodium bicarbonate to precipitate from the solution. The sodium bicarbonate is then filtered from the resulting aqueous solution and collected.

The sodium carbonate solution that is contacted with the gas stream containing hydrogen sulfide may comprise a substantially saturated solution. For instance, sodium carbonate may be contained in the solution in an amount of at least 17% by weight, such as in an amount of at least 20% by weight. The sodium carbonate solution, when contacting the gas stream, may be at a temperature of from about 90 degrees F. to about 120 degrees F.

In one embodiment, the process may further comprise the steps of dissolving the precipitated and filtered sodium bicarbonate in water to form a solution and then adding further amounts of sodium bicarbonate to the solution at an elevated temperature sufficient for the sodium bicarbonate to convert to sodium carbonate. The sodium carbonate may be recovered and reused in the process.

The process is particularly well suited to steam reforming black liquor to form the product gas containing hydrogen sulfide. The black liquor may be steam reformed in a fluidized bed containing sodium carbonate particles. The sodium carbonate content of the bed increases as the process occurs. Thus, in one embodiment, bed solids may be extracted to form a sodium carbonate solution which also may be used in scrubbing the product gas.

In another embodiment of a process for removing hydrogen sulfide from a product gas, the process includes the steps of contacting a gas stream containing hydrogen sulfide with a liquid containing an amine. The amine associates (absorbs or adsorbs) with the hydrogen sulfide in the gas stream and removes the hydrogen sulfide from the gas stream. The hydrogen sulfide laden liquid containing the amine is then heated to release the hydrogen sulfide and form a second gas stream. The hydrogen sulfide contained in the second gas stream is then oxidized in the presence of an oxygen containing gas to form a flue gas stream containing sulfur dioxide. The flue gas stream is then contacted with an aqueous solution containing sodium carbonate causing sodium sulfite crystals to form. The sodium sulfite crystals may be collected and used in various applications.

By using an amine to initially capture the hydrogen sulfide, a much smaller gas stream is produced for ultimately converting the hydrogen sulfide into the sulfite crystals. The amine used in the present invention may be, for instance, a tertiary amine or an alkanol amine. Examples of particular amines include monoethanol amine, diethanol amine, and methyldiethanol amine. The liquid containing the amine may be an aqueous solution containing the amine in an amount from about 30% to about 60% by weight. The liquid containing the amine may be heated to a temperature of from about 90 degrees F. to about 150 degrees F. when contacting the gas stream.

In order to release the hydrogen sulfide from the hydrogen sulfide laden liquid containing the amine, the liquid may be heated to a temperature of from about 250 degrees F. to about 350 degrees F. In one embodiment, for instance, the liquid may be heated by contacting the liquid with steam. The steam may be under pressure, having a pressure of about 50 psig.

The sodium carbonate solution may be preheated to a temperature of about 80 degrees F. to about 140 degrees F. when contacting the flue gas stream. The sodium carbonate solution may be substantially saturated with sodium carbonate. For instance, the sodium carbonate may be present in the solution in an amount of at least 15% by weight, such as in an amount of at least 20% by weight.

The product gas stream containing hydrogen sulfide may be collected from a steam reformer that is designed to steam reform carbonaceous materials, such as spent black liquor as described above.

In one embodiment, after contacting the gas stream containing hydrogen sulfide with a liquid containing an amine and after releasing the hydrogen sulfide from the liquid, the resulting gas stream may be contacted with a substantially saturated sodium carbonate solution in order to form a sodium sulfide and sodium bicarbonate. The sodium carbonate solution may be substantially saturated in order to cause the formed sodium bicarbonate to precipitate from the aqueous solution. The scrubbing process using the saturated sodium carbonate solution in this embodiment may be conducted similar to the process described above.

It should be understood that each of the above embodiments may be combined together as desired for forming additional embodiments. Additional features and aspects of the present invention are further described in greater detail below.

BRIEF DESCRIPTION OF THE FIGURES

A full and enabling disclosure of the present invention, including the best mode thereof to one of ordinary skill in the art, is set forth more particularly in the remainder of the specification, including reference to the accompanying figures in which.

DETAILED DESCRIPTION

Reference will now be made in detail to various embodiments of the invention. Each embodiment is provided by way of explanation of the invention, not limitation of the invention. In fact, it will be apparent to those skilled in the art that modifications and variations can be made in the invention without departing from the teaching and scope thereof, for instance, features illustrated or described as part of one embodiment to yield a still further embodiment derived from the teaching of the invention. Thus, it is intended that the invention cover such derivative modifications and variations to come within the scope of the invention embodiments described herein and their equivalents.

The present invention is generally directed to improved processes and systems for converting carbonaceous materials into a product gas stream. The product gas stream can contain, for instance, molecular hydrogen and low molecular weight hydrocarbon gases that have heating value and may be used as a fuel source. The process of the present invention generally uses steam reforming for energy and chemical recovery from the carbonaceous materials. Many different carbonaceous feedstocks may be fed to the process and system of the present invention including spent black liquor, biomass, sludge, coal, organic waste, and the like. A hydrogen-rich, medium calorific value gas is produced that may be used in numerous applications. For instance, in one embodiment, the product gas may be used for power generation through combined cycles based on gas turbines and/or fuel cells.

In various embodiments, the process of the present invention may be used to increase throughput and maximize product gas recovery. When the feedstock contains sulfur compounds, such as a spent black liquor feedstock, the process of the present invention may separate the sulfur from any alkali components and enables the use of advanced pulping chemistries to enhance pulp yield. In one particular embodiment, a process is disclosed that allows the reuse of sulfur contained in the feedstock while reducing the calcination load.

In order to gain appreciation of the various principles and embodiments of the present invention, first a steam reforming system and process will be described. According to the present invention, most processes may be carried out in a completely endothermic process. Alternatively, many of the processes of the present invention may be carried out in a partial oxidation system that combines combustion with endothermic reactions.

Endothermic Gasification Process

Figure 1:
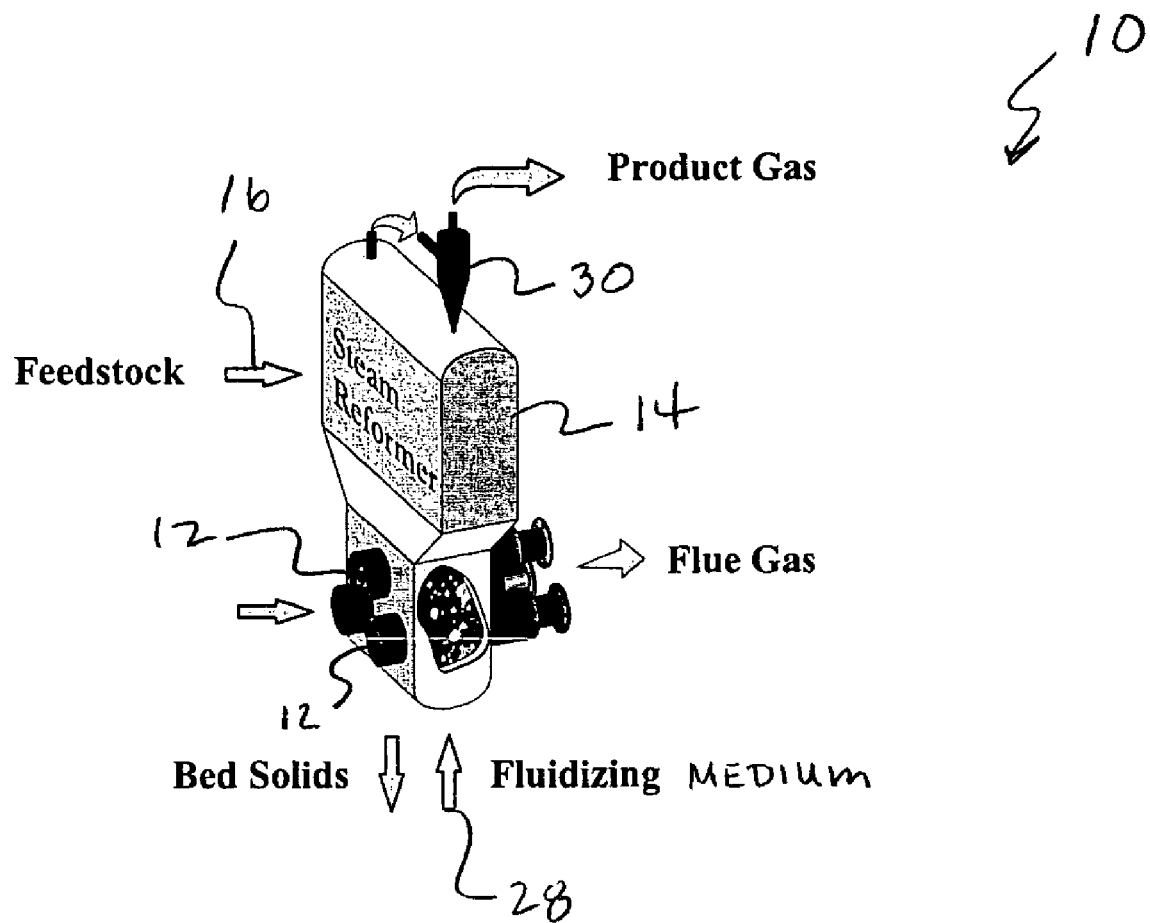
FIG. 1 is a perspective view of one embodiment of a thermochemical apparatus that may be used in the process and system of the present invention.

Referring to FIG. 1, a thermochemical apparatus generally 10 is shown that is capable of endothermically converting a carbonaceous material into a product gas stream. For instance, in one embodiment, the apparatus 10 may be used in a steam reforming process.

As shown, the apparatus 10 includes a fluidized bed 14 which is indirectly heated by one or more combustion devices 12. Although many different combustion devices may be used in the present invention, in one particular embodiment, the combustion devices 12 comprise pulse combustion devices.

Figure 2:
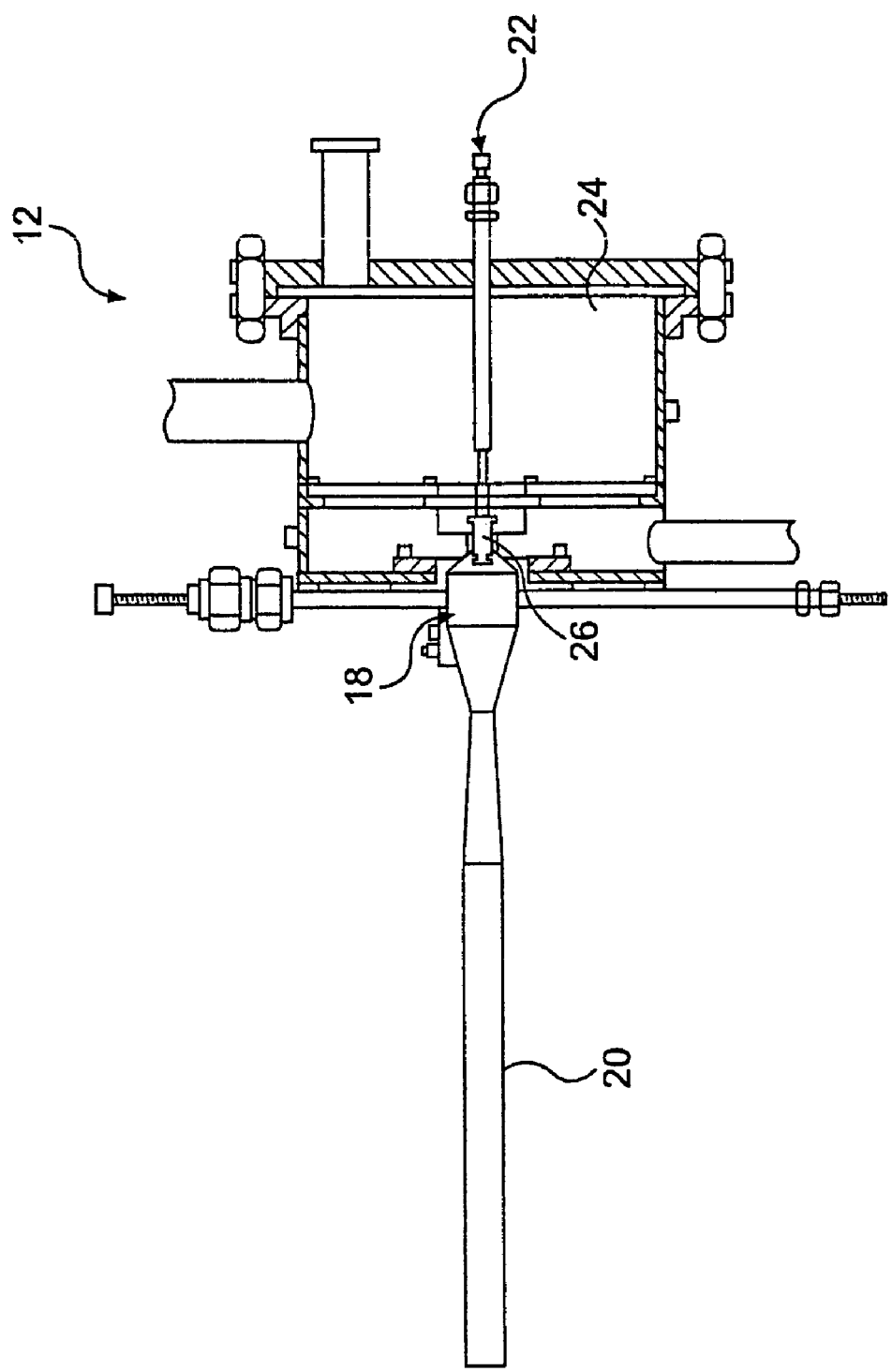
FIG. 2 is a cross sectional view of a pulse combustion device.

For example, referring to FIG. 2, one embodiment of a pulse combustion device generally 12 is shown. Pulse combustion device 12 includes a combustion chamber 18 in communication with a resonance tube 20. Combustion chamber 18 can be connected to a single resonance tube as shown in FIG. 2 or a plurality of parallel tubes as shown in FIG. 1 having inlets in separate communication with the pulse combustion chamber. Fuel and air are fed to combustion chamber 18 via a fuel line 22 and an air plenum 24. Pulse combustion device 12 can burn either a gaseous, a liquid and/or a solid fuel.

In order to regulate the amount of fuel and air fed to combustion chamber 18, pulse combustion device 12 can include at least one valve 26. Valve 26 is preferably an aerodynamic valve, although a mechanical valve or the like may also be employed.

During operation of the pulse combustion device 12, an appropriate fuel and air mixture passes through valve 26 into combustion chamber 18 and is detonated. During start up, an auxiliary firing device such as a spark plug or pilot burner is provided. Explosion of the fuel mixture causes a sudden increase in volume and evolution of combustion products which pressurizes the combustion chamber. As the hot gas expands, preferential flow in the direction of resonance tube 20 is achieved with significant momentum. A vacuum is then created in combustion chamber 18 due to the inertia of the gases within resonance tube 20. Only a small fraction of exhaust gases are then permitted to return to the combustion chamber, with the balance of the gas exiting the resonance tube. Because the pressure of combustion chamber 18 is then below atmospheric pressure, further air-fuel mixture is drawn into the combustion chamber 18 and auto-ignition takes place. Again, valve 26 thereafter constrains reverse flow, and the cycle begins anew. Once the first cycle is initiated, operation is thereafter self-sustaining.

Pulse combustion devices as described above regulate their own stoichiometry within their ranges of firing without the need for extensive controls to regulate the fuel feed to combustion air mass flow rate ratio. As the fuel feed rate is increased, the strength of the pressure pulsations in the combustion chamber increases, which in turn increases the amount of air aspirated by the aerodynamic valve, thus allowing the combustion device to automatically maintain a substantially constant stoichiometry over its desired firing range.

Pulse combustion device 12 produces a pulsating flow of combustion products and an acoustic pressure wave. In one embodiment, the pulse combustion device produces pressure oscillations or fluctuations in the range of from about 1 psi to about 40 psi and particularly from about 1 psi to about 25 psi peak to peak. These fluctuations are substantially sinusoidal. These pressure fluctuation levels are on the order of a sound pressure range of from about 161 dB to about 194 dB and particularly between about 161 dB and about 190 dB. Generally, pulse combustion device 12 can have an acoustic pressure wave frequency of from about 50 to about 500 Hz and particularly between about 50 Hz to about 200 Hz. Generally, the temperature of the combustion products exiting the resonance tube 29 will range from about 1200 degrees F. to about 2000 degrees F.

As shown in the embodiment in FIG. 1, multiple resonance tube pulse combustion devices 12 are immersed in the fluidized bed 14 to supply the required indirect heat for the endothermic reactions. The heater module has no moving parts. Combustion air is supplied to the air inlet plenum, for instance, from a forced draft fan. The air is then aspirated into the pulsed combustion devices through multiple aerovalves, which function like flow diodes. Fuel is injected through a series of ports surrounding each aerovalve. The hot gases flow through the tube bundle where the heat is transferred to the fluid bed 14. The cooled combustion gases are then collected in a flue gas exit plenum and ducted, for instance, to waste heat recovery equipment.

The pulsed heaters provide two critical functions: 1) near uniform heat flux and 2) high heat transfer rates. Uniform heat flux avoids high tube wall temperatures, which limit material life and can cause localized bed solids melting. The high heat transfer rates of pulsed combustion devices minimize the tube surface area requirements and thus reduce capital costs. The pulse combustion devices provide a secondary advantage in that their self-aspirating characteristics offer reduced combustion air fan power requirements, despite the high flue gas velocities achieved in the heat exchange tubes. Pulse combustion is also well known for reduced emissions of oxides and nitrogen.

In conventional combustion devices, essentially all of the heat is released by burning the fuel in the combustor. The heat is stored in the form of sensible heat in the flue gas, which is at its peak temperature at the inlet to the fire tubes. This requires the use of a high-temperature material at the inlet region of the fire tube. As the heat is transferred from the flue gas through the fire tubes, the temperature of the flue gas monotonically decreases along the length of the tube. In this case, most of the heat transfer on the flue gas side of the tube is convective. The radiant contribution decreases along the length of the tube.

In pulse combustion devices, however, not all of the fuel burns in the combustion chamber and combustion persists down the resonance tubes for a significant length in an oscillating flow field environment. Thus, for the same heat transfer duty, the inlet flue gas temperature to the resonance tubes is lower than in conventional systems. Also, the continued heat release from burning fuel in the resonance tubes maintains a higher bulk flue gas temperature than in the conventional case. Radiant heat transfer will also maintain to a longer length on the flue gas side of the resonance tube. A large enhancement in the convective heat transfer component is also achieved due to the oscillatory flow field of the gases.

As shown in FIG. 1, by indirectly heating the fluidized bed 14, the exothermic reactions occurring in the pulse combustion devices 12 are separated from the endothermic reactions occurring in the bed itself. In this manner, the product gas stream produced in the bed is not diluted with a combustion gas stream emitted by the pulse combustion devices 12.

The fluid bed apparatus 10 is provided with one or more material introduction ports 16. The introduction port 16 may be configured to inject a solid material, liquid material, or slurry into the fluidized bed 14. The fluidized bed 14 is charged with solid bed particles comprising a suitable bed material which may be inert or may be of catalytic nature providing catalytic enhancement of reactions within the bed. The fluid bed apparatus 10 is also provided with a port 28 near the bottom of the reactor for introduction of a fluidization medium which may be steam, a gas, evaporated liquids other than steam or a combination thereof. The flow of the fluidization medium within the fluid bed apparatus is distributed in a manner which is substantially uniform over the cross-section of the bed. For instance, in one embodiment, a distributor plate may be used for distributing the fluidizing medium within the fluidized bed 14.

In order to carry out a steam reforming process, a fluidizing liquid vapor or gas is injected into and through the fluidized bed 14 through the port 28 at a rate operable for maintaining the solid particles in the bed in an agitated state. The solid particles in the reaction zone are heated by heat transfer from the combustion product stream in the resonance tubes.

A carbonaceous material is introduced into the fluidized bed 14 from the introduction port 16. The carbonaceous material is mixed with the heated solid particles of the bed and the fluidizing medium, and, thus undergoes endothermic reaction or physical change in the bed and is converted to useful products. The intense acoustic field radiated into the bed of solid particles by the pulse combustion devices 12 enhances mixing of the bed with the carbonaceous material and increases rates of mass transport and reactions in the bed, thereby resulting in relatively high process throughput rates.

The residence time of the carbonaceous materials in the fluidized bed 14 may vary widely depending upon the particular application. The residence time for solids, for instance, may be from about 20 hours to about 80 hours, such as from about 50 hours to about 60 hours, especially at lower temperatures that prevent the formation of slag. Residence time for gases and vapors, on the other hand, may be less than 20 seconds, such as from about 10 to about 15 seconds. Generally it is desirable to operate the bed within a narrow temperature window to maximize reduction and separation of sulfur from any alkali.

A wide range of bed materials may be used in the fluidized bed 14. The use of a particular type of fluidized bed depends upon the carbonaceous material, the process being carried out, and the products desired. Bed material can be an inorganic material including, e.g., sand, ash or a metal salt, or may be an organic material. The size of the bed material may be, for instance, in the range of from about 50 to about 500 microns.

The fluidizing medium, e.g., steam is injected into and passes through the bed material at a superficial velocity of from about 1 foot per second to about 10 feet per second. The bed material thus undergoes fluidization and remains in a continuous state of agitation. Fluidized bed density varies with the velocity and viscosity of the fluidizing medium and size distribution, density and shape of the bed particles. The fluidizing medium may be fed to the reactor by a blower, a compressor or pump, through a gas distribution plate.

After the bed of solid particles attains a uniform state of fluidization, air and fuel are fed to the pulse combustion devices 12. As stated above, the fuel can be a liquid, a gas, a solid, or mixtures thereof. In one embodiment, the fuel may contain a portion of the product gas that is formed in the fluidized bed. For many applications, a liquid fuel such as a heavy fuel oil, or a gaseous fuel, such as natural gas is used to operate the pulse combustion devices 12.

As a carbonaceous material is fed to the fluidized bed, the carbonaceous materials undergo endothermic reactions and are converted into a product gas. The product gas and a portion of the fluidizing medium leave the apparatus 10 through a conduit at the top of the fluidized bed 14. Entrained solid particles, if any, may be separated in a cyclone 30 and sent back into the fluidized bed 14. If the product gas contains a condensable component, then at least a portion may be cooled to condense any readily condensable components, which are then transferred to a product recovery zone.

Although the above described fluidized bed apparatus may be used to process various different carbonaceous materials, the system is particularly well suited to converting black liquor into a useful product gas stream. The following is a description of a process for reforming black liquor. It should be understood, however, that the following process parameters may equally be applied to other similar carbonaceous materials.

Black liquor, the bi-product of pulping processes, generally contains biomass-derived lignins and inorganic sodium and, in some instances such in the case of Kraft liquor, sulfur process chemicals. When processing black liquor, the black liquor may be, for instance, injected into the fluidized bed 14 through one or more ports 16. For example, dual-fluid atomizers may be used to spray the liquor directly into the fluidized bed material. In one embodiment, the bed material is sodium carbonate (soda ash) having a particle size distribution of from about 150 microns to about 600 microns, with a preferred mean size of about 250 microns. The liquor injector design can provide a thin film coating of bed particles to enhance reaction rates and carbon conversion.

The fluidized bed apparatus 10 may be provided with steam to fluidize the bed. The steam temperature entering the bed may be from about 1100 degrees F. to about 1200 degrees F. and the fluidization velocity may be from about 2 feet per second to about 4 feet per second.

In order to prevent bed agglomeration, black liquor may be fed into the fluidized bed at a temperature of less than about 1300 degrees F., such as less than 1200 degrees F. At this temperature, the carbon deposition rate is higher than the gasification rate. The soda ash bed material may have a residual layer of carbon in order to prevent bed agglomeration. Where the starting soda ash contains an excessively low carbon level, the entire carbon layer may be gasified by the fluidizing steam before the bed reaches the desired starting temperature. When the carbon layer disappears due to gasification, soda ash may fuse together as a result of impurities. A carbon layer on the soda ash granules can be maintained to prevent such ash fusion. Char gasification on the sodium carbonate solids is preferably controlled by feed rate and temperature such that the bed establishes an equilibrium carbon level of between about 0.5 to about 10%.

The reactor temperature may be maintained in the range of from about 1100 degrees F. to about 1300 degrees F. to ensure that smelt formation does not occur. The product chemicals can then be easily and safely discharged from the fluidized bed in a solid state.

The bed is preferably operated at near atmospheric pressure with a superficial fluidization velocity of approximately 3 feet per second. As described above, the fluidized bed 14 is heated indirectly by resonance tubes of the pulse combustion devices 12. The flue gases from the pulse combustion devices, which exit the apparatus at about 1200 degrees F. to about 1400 degrees F., may be sent to a water or fire tube boiler for heat recovery. The product gas may have a heating value of approximately 300 to 400 Btu/scf and can be generated from 67% black liquor.

Various different solids and discharge systems may be associated with the fluidized bed 14. Typically, the apparatus is furnished with a screw-type solids withdrawal valve and solids are collected at regular intervals to measure carbon content as a function of throughput in order to monitor specific gasification rates. Despite the fact that both sulfur and sulfate are being introduced to the bed in the form of black liquor, the bed sulfur and sulfate levels diminish or remain constant. Sulfide content is negligible in the bed.

The solids that are drawn off the fluidized bed 14 are comprised primarily of sodium carbonate and also include sodium sulfide, sodium sulfate, sodium chloride, and residual carbon. In one embodiment, these materials may be dissolved in a dissolution tank to recover the inorganic salts for recycling. If desired, the carbon value may be recovered, e.g., in an agitating dissolving tank followed by a disk filter for carbon recovery.

The bulk of the black liquor feed sulfur content is advantageously emitted in the form of hydrogen sulfide during the process. In U.S. Pat. No. 5,059,404, a process is described for recovering the hydrogen sulfide to form green liquor through a scrubbing operation. In particular, in the '404 patent, the product gas enters a scrubbing column where the recirculating scrubbing liquid comprises alkaline sodium carbonate formed in the dissolving tank. The process gas is scrubbed to form green liquor. The cleaned, desulfurized product gas generated from the scrubber may be utilized as a fuel source for a boiler, gas turbine or other unit. The green liquor may then be sent to the conventional mill causticizing loop, where lime is added to precipitate carbonate and, thus, form sodium hydroxide and sodium sulfide.

The primary sulfur reactions believed to occur in the gasifier include the following:

$$Lignin \rightarrow Organic\ Sulfides + H_2S$$

$$Organic\ Sulfides + H_2O \rightarrow CO, CO_2, H_2 + H_2S$$

$$Na_2S + H_2O + CO2 \rightarrow Na_2CO_3 + H_2S$$

$$Na_2SO_4 + 4CO \rightarrow Na_2S + 4CO_2$$

$$H_2O + CO \rightarrow CO_2 + H_2$$

Reactions (1) and (2) represent thermal and steam gasification steps leading to the production of low molecular weight gas species and hydrogen sulfide. Due to the catalytic nature of the inorganic salts, the steam gasification reactions diminish organic sulfide species to very low levels. Reaction (3) depicts the carbonation of sodium sulfide in the presence of steam and carbon dioxide. This reaction becomes important when the partial pressure of steam is high and temperatures are relatively low, such as found in the gasifier. Reaction (4) represents the reduction of sodium sulfate to sodium sulfide via the reaction with carbon monoxide. Reaction (5) represents the water-gas shift equilibrium which primarily effects the relative ratio of carbon monoxide to carbon dioxide. Neither sodium sulfate nor sodium sulfide is stable in the gasifier environment. The net reaction for sulfate is, therefore:

$$Na_2SO_4 + 4CO + H_2O \rightarrow Na_2CO_3 + 3CO_2 + H_2S$$

The hydrogen sulfide is then absorbed in an aqueous phase to regenerate sodium sulfide. The sodium carbonate solution generated by dissolution of the bed solids provides an ideal solution for scrubbing the product gas. Since the sodium carbonate solution so formed is slightly basic, the acidic hydrogen sulfide species is absorbed as sodium bisulfide. This green liquor is then returned to the conventional causticizing loop.

In black liquor applications, as described above, the fluidized bed 14 is maintained at a relatively low temperature. In the embodiment described above, the reactions are solely steam-reforming, endothermic reactions in a reducing environment. Bed conditions are maintained so that substantially no smelt is formed during the process.

In black liquor recovery, a lower steam reformer fluid bed temperature is possible because of the steam promoting effects of the alkali in the liquor and the large residence time for which the reformer is designed. The alkali in the liquor enables carbon and hydrocarbon steam reforming reactions to take place at lower temperatures. The highly reducing atmosphere in the steam reformer and the longer residence time are employed to affect the reduction of sulfur compounds to hydrogen sulfide and enable the separation of the sulfur from the alkali. The above described steam reforming recovery process permits a wide spectrum of pulping chemistries and pulping processes.

Autothermal Gasification Process

In an alternative embodiment of the present invention, the fluidizing medium in the steam reformer contains relatively small amounts by volume of oxygen or air. The oxygen or air is used to convert some of the unreacted carbon or char present within the fluidized bed to carbon monoxide and carbon dioxide. Further, upon formation of carbon monoxide or carbon dioxide heat is released.

By including small amounts of oxygen or air in the reactor during steam reformation according to the process, various benefits may be obtained. For instance, the release of heat due to the reaction between carbon and oxygen reduces the amount of heat that must be transferred from the reactor, which also reduces the capital costs associated with the reactor. Also, the production of carbon monoxide by the reaction between carbon and oxygen increases the overall gas produced (BTU/lb of feed), increasing the cold gas efficiency. Further, the heating value and mass of the solid residue contained within the reactor is reduced.

According to one embodiment, for instance, black liquor is injected into the fluidized bed through a steam-atomized spray nozzle. The black liquor can be fed at the side of the reactor or from the bottom. The bed temperature may be kept below about 1300 degrees F. to about 1350 degrees F. to prevent softening or melting of various compounds found within the fluidized bed which would lead to bed agglomeration and the formation of undesirable molten smelt.

Once fed to the reactor, the black liquor forms a relatively thin coating on the surface of the solid particles and is pyrolyzed at a very high rate. This provides a high surface area and porosity for the rapidly pyrolyzing black liquor coating, sufficient for completing steam gasification, sodium sulfate reduction to sodium sulfides, release of sulfur-containing hydrocarbons found in the liquor in the form of hydrogen sulfide, and the formation of sodium carbonate from the sodium contained within the black liquor. For most applications, the bed temperature may be between about 1000 degrees F. to about 1200 degrees F.

Upon entering the reactor, the black liquor is converted into a product gas and a solid composition. The product gas may include hydrogen sulfide, carbon monoxide, carbon dioxide, molecular hydrogen, and particulate matter including carbon and tar. The solid composition, on the other hand, which is deposited into the bed, is comprised of char, carbon, inorganic salts, and mineral matter.

From the reactor, the product gas can then be processed as desired for various useful purposes. In one embodiment, the product gas can be fed to a particulate collection system such as a sintered metal baghouse and/or a cyclone to remove any particulate matter. The product gas can then be fed through water cooled traps for condensing any steam present within the gas stream. Next, the product gas can be fed to a scrubber, such as a venturi scrubber, for ultimately converting hydrogen sulfide into green liquor.

As stated above, the solid composition resulting from the black liquor feedstock remains within the fluidized bed in the reactor. According to this embodiment, small amounts of air, such as about 1 percent to about 10 percent of stoichiometric air, can be added to the reactor for reacting with the carbon and char found in the bed solids. This reaction not only releases heat but forms carbon monoxide and carbon dioxide which are then mixed with the product gas stream.

Since the oxygen and carbon reaction are exothermic, if too much oxygen were added to the reactor, the temperature may increase, possibly causing smelt formation. As such, the temperature should be carefully monitored in the reactor. Further, carbon should be allowed to build up in the bed solids, preferably above 5 percent by weight, before air addition begins. Also, oxygen concentration in the fluidizing steam should be below about 3 percent by weight (1.8 percent by volume).

The amount of heat that is released through the carbon and oxygen reactions are as follows:

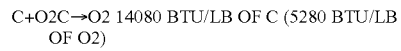

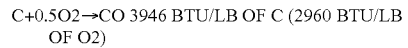

The actual heat release due to the above reactions will depend upon the carbon monoxide/carbon dioxide and water gas shift equilibria.

By adding small amounts of oxygen, the sensible heat to the fuel calorific value ratio in the product gas is reduced.

The more the fuel calorific value yield in the product gas, the greater the opportunity to employ a topping cycle to enhance the power production efficiency of the overall central heat and power (CHP) system. For example, a combined cycle gas turbine system is more efficient than a high-pressure boiler in power generation. Oxygen blown autothermal gasification may reduce the dilution effects of nitrogen in the product gas and thermal load and thermal losses associated with cold gas cleanup.

The present invention is generally directed to further improvements in various processes and systems for steam reforming carbonaceous feedstocks and converting the feedstocks into a useful product gas. Various features and aspects of the present invention will now be discussed in relation to improvements directed to maximizing energy conversion, increasing throughput through the system, and directed to minimizing calcination loads. It should be understood that the embodiments of the present invention described below may be used isolated from one another or in combination.

Drying of Feedstock

In one embodiment of the present invention, especially when feeding a liquid feedstock or a feedstock in the form of a slurry to the thermochemical system, the present inventors have discovered that the various advantages and benefits may be obtained if the feedstock is at least partially dried prior to being injected into the fluidized bed 14. By reducing the moisture content of the feedstock, the heat load per unit weight of feedstock is lessened. Thus, a smaller heating device may be used to heat the fluidized bed 14. In particular, by removing moisture prior to entry into the fluidized bed, the fluidized bed avoids having to expend energy in order to heat and evaporate the water. In fact, the amount of heat required to endothermically convert carbonaceous material to gas is very similar to the amount of heat required to vaporize the same amount of water and raise the temperature of the water to the reactor temperature. By removing the moisture, the system simultaneously increases throughput of the carbonaceous material and improves in efficiency.

Figure 4:
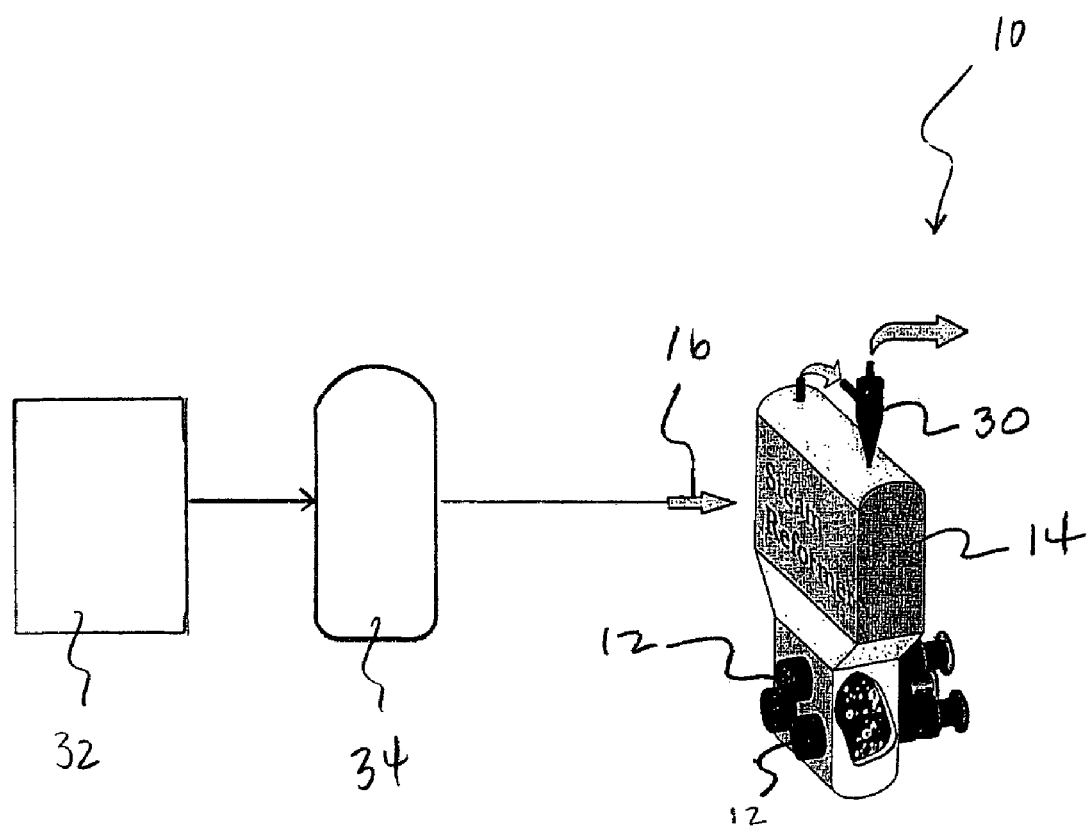
FIG. 4 is a diagram of one embodiment of a thermochemical system in accordance with the present invention.

In general, the feedstock may be partially dried in accordance with the present invention using any suitable device or method without limitation. For exemplary purposes, however, one embodiment of a system for partially drying a feedstock prior to being steam reformed is shown in FIG. 4. In this embodiment, the system includes one or more evaporators 32 that are configured to receive a feedstock and to remove some of the moisture. From the evaporators 32, the feedstock is then fed to a drying device 34. In one embodiment, for instance, the drying device 34 may be a fluidized bed. The fluidized bed, for instance, may be fluidized with steam and may be indirectly heated by condensing steam in tubes inserted into the bed. From the fluidized 34, the feedstock is then fed to the fluidized bed 14 of the steam reforming apparatus 10. Once injected into the apparatus 10, the feedstock is endothermically converted to a gas, such as by steam reforming.

The feedstock may be fed to the fluidized bed 14 using various methods. For example, in one embodiment, the feedstock may be screw fed to the fluidized bed 14. In another embodiment, a carrier gas may be combined with the feedstock and fed to the fluidized bed 14.

Of particular importance, however, is that the dried feedstock have an average particle size, a particle size distribution, and a solids concentration, such that when the feedstock is injected into the fluidized bed 14, the particles melt upon introduction into the fluidized bed and form a layer of molten liquor on the surface of the bed particles. Should the feedstock particles not coat the bed particles, the feedstock particles may immediately entrain themselves in the fluidizing medium and exit the fluidized bed without undergoing the desired endothermic reactions. For instance, if a significant amount of fines are generated, carbon conversion efficiencies will be reduced. Further, materials that may normally be captured in the bed, such as alkali carbonates, may undesirably exit the fluidized bed and fail to be recaptured.

The average particle size, particle size distribution and solids concentration of the feedstock may vary depending upon the particular application, the feedstock being processed, and the properties of the thermochemical apparatus 10.

When processing spent black liquor from a pulping process, for instance, black liquor is normally found to have a solids concentration of no greater than about 70%. Through the use of the evaporator 32 in conjunction with the fluidized bed 34, however, the solids concentration of a spent black liquor may be increased to greater than about 75%, such as greater than about 80%. For example, in one embodiment, the spent black liquor may be predried to a solids concentration of greater than about 90%, such as greater than about 95%.

At the above solids concentrations, the black liquor may be fed to the fluidized bed 14 so as to have an average particle size of from about 45 microns to about 120 microns. At these sizes, and assuming a normal Gausean size distribution, it is believed that the particles will coat the bed particles contained in the fluidized bed 14. In feeding the carbonaceous material to the fluidized bed 14 at a particular particle size, in some embodiments, it may be necessary to include a particle size classifier within the system. Of particular advantage, however, the fluidized bed 34 as shown in FIG. 4 may serve as a particle size classifier in addition to partially drying the feedstock. For example, the fluidized bed may be operated so that small particles become entrained within the fluid medium and removed from the feedstock being fed to the reforming apparatus 10.

In order to demonstrate improvements in drying the feedstock, it is estimated that by increasing the solids content of a spent black liquor feedstock from about 60% to about 95% will result in an improvement in throughput close to about 58%. Furthermore, the efficiency of the process also improves. For example, for a pound of black liquor at a solids concentration of about 60%, the net product gas heating value produced by the thermochemical apparatus 10 may be estimated, in one embodiment, to be about 1200 BTU/lb. When the solids concentration of the spent liquor, however, is increased to 95%, the net product gas heating value is estimated to increase to over 3500 BTU/lb. Thus, the heating value of the product gas may increase by over 200%.

Increased Throughput with Partial Oxidation

Another method of increasing throughput of feedstock through the thermochemical apparatus 10 of the present invention may be accomplished by reducing the temperature of the fluidized bed 14. There is a relationship between bed operating temperature, fluidization velocity, feedstock injection rate, reactor throughput, and carbon conversion. Reducing the bed temperature simultaneously increases the heat flux from the heater tubes to the bed due to the increase in the temperature difference between the temperature of the tubes and the bed material itself. The throughput increase is due to the decrease in carbon conversion because carbon, when converted to carbon monoxide, carbon dioxide and hydrogen by the steam reforming reaction consumes a significant amount of heat. As stated above, however, although throughput does increase when the temperature of the fluidized bed is reduced, carbon conversion decreases.

As carbon conversion decreases, greater amounts of carbon begin to accumulate in the fluidized bed 14. For instance, carbon levels may increase greater than about 5%, such as greater than about 10%. In accordance with the present invention, bed solids are periodically extracted from the fluidized bed 14 and fed to, for instance, a carbon trim cell that is designed to further gasify the unreacted carbon.

Figure 5:
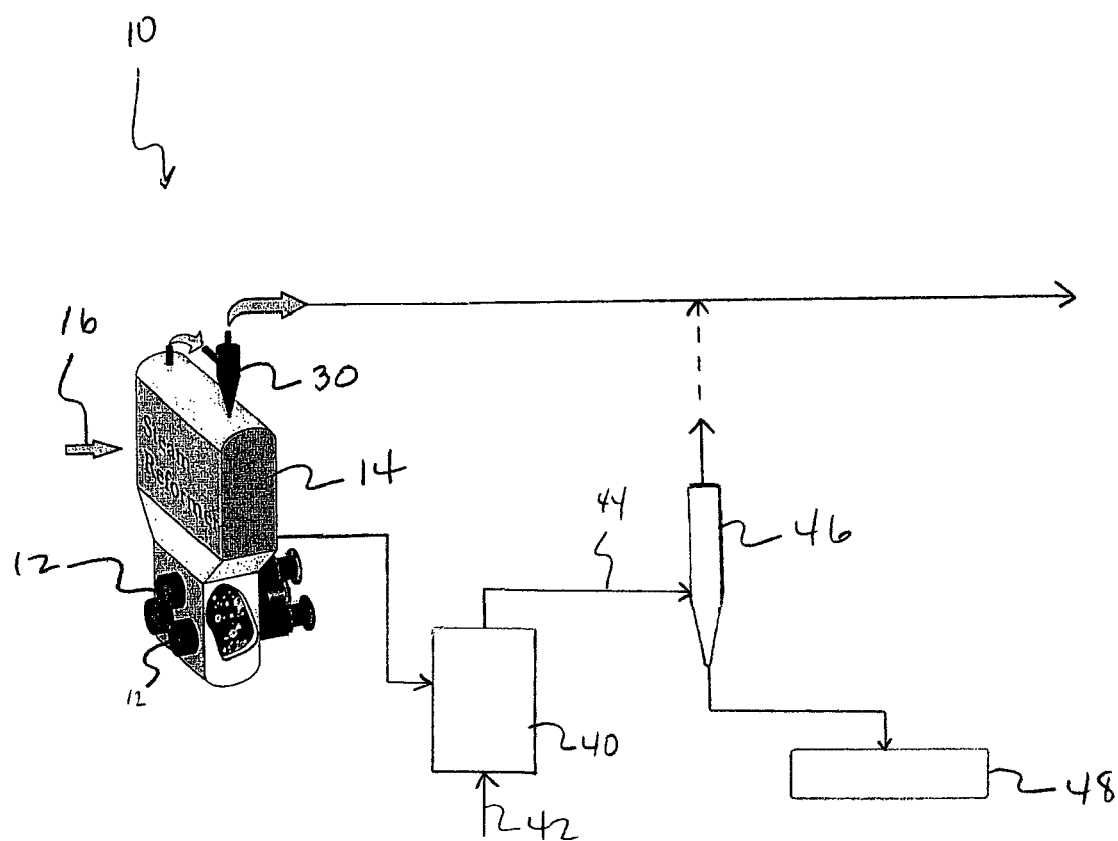
FIG. 5 is a diagram of another embodiment of a thermochemical system of the present invention.

For example, one embodiment of a system containing a carbon trim cell 40 is shown in FIG. 5. As shown, the carbon trim cell 40 receives bed solids from the fluidized bed 14. The bed solids may be continuously fed to the trim cell 40 or may be fed intermittently. The carbon trim cell 40 comprises any suitable heating device capable of gasifying carbon. For example, in one embodiment, the carbon trim cell is a fluidized bed that is small in relation to the fluidized bed 14. The fluidized bed 40 is fluidized by a mixture of steam and an oxygen containing gas. The oxygen containing gas can be, for instance, pure oxygen or air. As described above, by feeding oxygen to the fluidized bed 40, oxidation of carbon within the bed occurs creating an autothermal gasification process. Specifically, as shown in FIG. 5, an oxygen containing gas and steam are fed through a bottom port 42 of the fluidized bed 40. The oxygen and steam contact carbon contained within the bed. A portion of the carbon is oxidized by reacting with the oxygen. Another portion of the carbon, however, is reformed by contact with the steam and is converted to hydrogen and a carbon oxide. Of particular advantage, carbon oxidation increases the temperature of the bed eliminating the need to heat the bed using an external heat source. The bed particles contained within the fluidized bed 40 may be the same materials as contained in the fluidized bed 14. For example, in one embodiment, the fluidized bed 40 contains sodium carbonate particles.

As shown in FIG. 5, a product gas 44 is generated within the fluidized bed 40. The product gas stream 44 contains products of carbon oxidation, products of carbon steam reforming and entrained fines. In the embodiment shown in FIG. 5, the product stream 44 is first fed to a filtering device 46, such as one or more cyclones or other high efficiency filter. Once filtered, the product gas may be used as desired. For example, in one embodiment, the product gas from the fluidized bed 40 may be combined with the product gas emanating from the fluidized bed 14.

The fines that are collected in the filtering device 46, on the other hand, may be dissolved in a dissolution tank 48 to recover the inorganic salts for recycling if desired. The carbon value may be recovered by filtering the solution contained in the dissolution tank.

The amount of oxygen fed to the carbon trim cell or fluidized bed 40 may vary depending upon the particular application. In general, oxygen levels may be adjusted in order to adjust the temperature of the fluidized bed while simultaneously maximizing the steam reforming process. For many applications, for instance, oxygen may be fed to the fluidized bed 40 in an amount from about 20% to about 50% of the stoichiometric amount necessary to oxidize all of the carbon contained in the bed. In other embodiments, however, less than about 20%, such as less than about 10% of stoichiometric oxygen may be fed to the bed.

In one embodiment, the temperature of the fluidized bed 40 may be higher than the temperature of the fluidized bed 14. In particular, in this embodiment, the temperature of the fluidized bed 14 is minimized while carbon oxidation occurs in the fluidized bed 40. When reforming spent black liquor, for instance, the fluidized bed 14 may be maintained at a temperature of less than about 1200 degrees F., such as less than about 1150 degrees F. The temperature of the fluidized bed 40, on the other hand, may be greater than about 1200 degrees F., such as from about 1200 degrees F. to about 1350 degrees F., and particularly from about 1200 degrees F. to about 1275 degrees F.

For purposes of illustration, when processing spent black liquor, it is estimated that by reducing the temperature of the fluidized bed 14 from 1120 degrees F. to 1100 degrees F. (only 20 degrees F. difference) the throughput may be increased in amounts greater than about 30%. Carbon conversion, however, is reduced such that carbon in the bed may change from about 1.5% to about 10%. In accordance with the present invention, the excess carbon may be efficiently fed to the carbon trim cell 40 and gasified. The bed solids may be extracted from the fluidized bed 14 by using, for instance, a screw feed or through the use of one or more cyclones.

Figure 6:
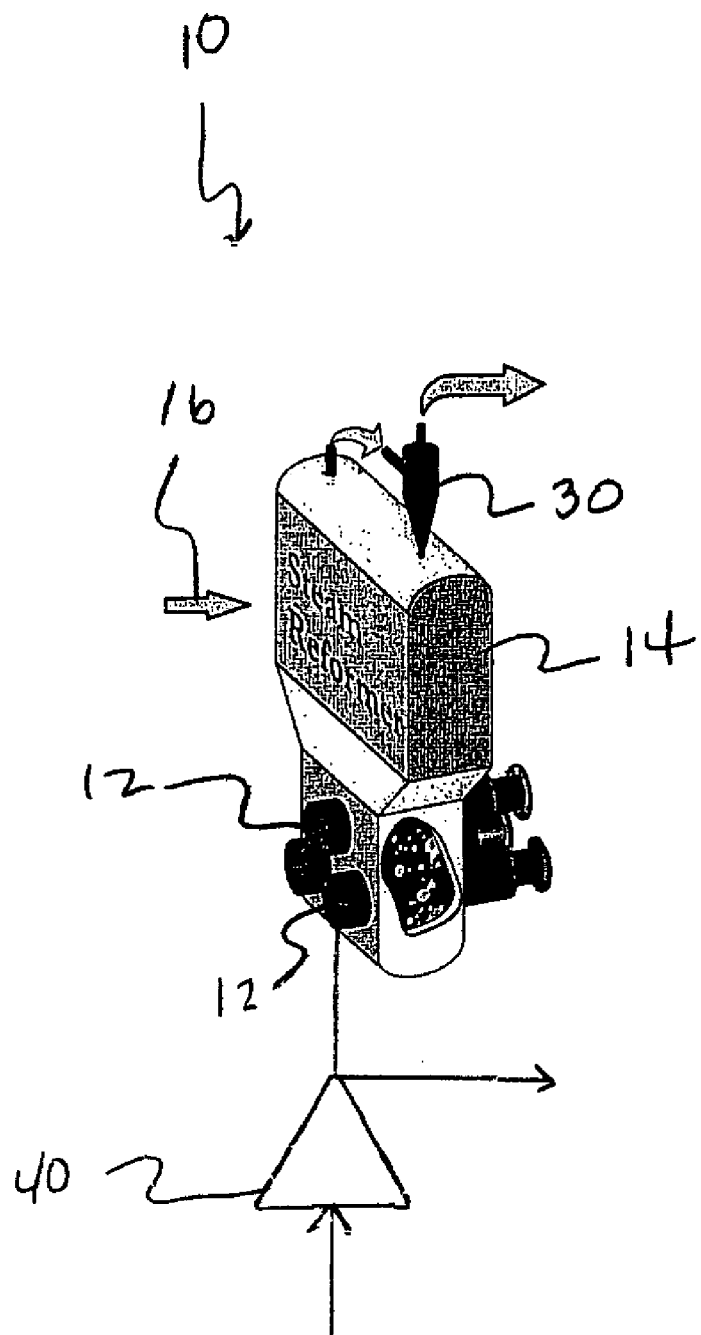
FIG. 6 is a diagram of still another embodiment of a thermochemical system of the present invention.

In the embodiment illustrated in FIG. 5, the carbon trim cell 40 is shown separate from the thermochemical apparatus 10. In other embodiments, however, the carbon trim cell 40 may be internal to the apparatus 10. For example, referring to FIG. 6, an alternative embodiment of a steam reforming system containing a carbon trim cell 40 is shown. In this embodiment, the fluidized bed drain nozzle 40, which is located below the fluidized bed 14, may itself be converted into a fluidized bed or fixed bed carbon trim cell. For example, the bed drain nozzle of the fluidized bed 14 may be made tapered and having a length to accommodate greater amounts of material. In one embodiment, for instance, as shown in FIG. 6, the bed drain nozzle may have a shape that is similar to an inverted frustum of a cone with a shallow angle to the vertical. A gaseous medium comprising a mixture of steam and an oxygen containing gas may be fed to the bed drain nozzle 40 causing carbon oxidation and steam reforming to occur before the bed material is extracted from the bottom of the fluidized bed 14. More particularly, the gaseous medium is fed through the bed drain nozzle 40 and into the bottom portion of the fluidized bed 14 where it gasifies carbon particles. Due to carbon oxidation, the temperature of the bed drain nozzle 40 may increase to greater than about 1200 degrees F., such as when processing spent black liquor. More particularly, the temperature of the bed drain nozzle 40 may increase to from about 1200 degrees F. to about 1275 degrees F. while the temperature of the fluidized bed 14 is maintained below 1200 degrees F. In general, the bed drain nozzle 40 as shown in FIG. 6 may operate according to the same parameters discussed above with respect to the fluidized bed 40 as shown in FIG. 5.

Once the carbon in the bed drain nozzle 40 is converted into a gas, the resulting gas may be fed directly into the fluidized bed 14. In an alternative embodiment, however, the resulting product gas may be side vented into the freeboard and later combined with the product gas emanating from the fluidized bed 14. The bed drain nozzle, as mentioned above, may operate as a fluidized bed or a fixed bed. Further, the process may be carried out in a batchwise manner or in a continuous manner.

Calcination Load Reduction

As described above, when processing feedstocks containing sulfur, such as spent black liquor, in many applications, the sulfur converts almost entirely to hydrogen sulfide which remains in the product gas stream that emanates from the fluidized bed. In U.S. Pat. No. 5,059,404, the hydrogen sulfide is recovered to form green liquor through a scrubbing operation. In particular, the product gas is cooled and then fed to a scrubbing column for contact with an alkaline sodium carbonate. The alkaline sodium carbonate may be formed by extracting solids from the fluidized bed and feeding the solids to a dissolving tank. Green liquor is formed from the hydrogen sulfide and the desulfurized product gas may be used as desired. The green liquor may then be sent to a conventional mill causticizing loop, where lime (calcium hydroxide) is added to precipitate carbonate and form sodium hydroxide and sodium sulfide.

Use of calcium oxide as described above in forming caustic soda from the sodium carbonate requires calcination which, in some plants, may constitute a significant energy sink. The present invention, however, offers various methods for reducing calcination requirements.

Figure 7:
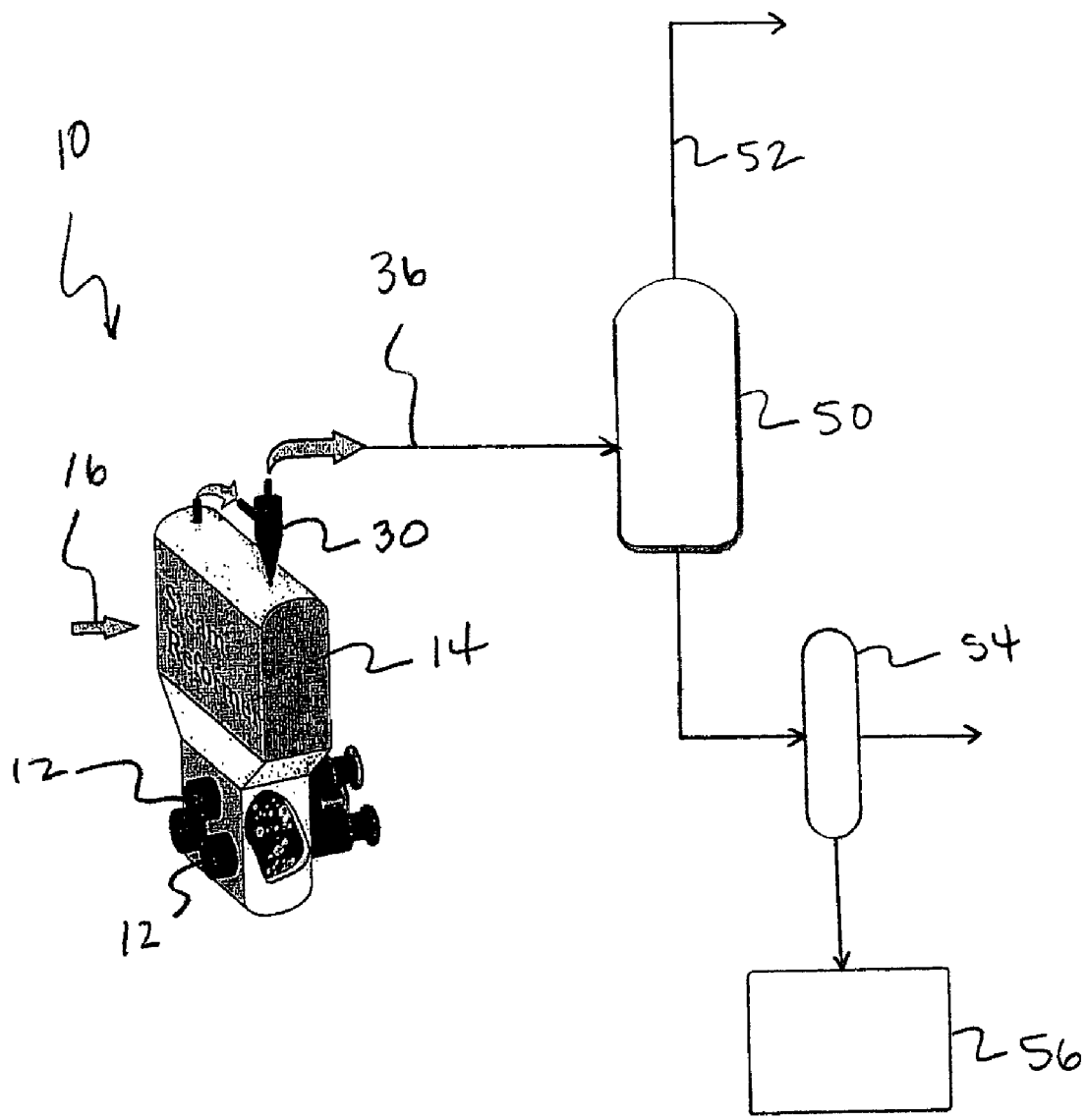
FIG. 7 is a diagram of another embodiment of a thermochemical system of the present invention.

For example, in one embodiment, as shown in FIG. 7, a system for removing hydrogen sulfide from a product gas 36 is shown. Product gas 36 is produced in the fluidized bed 14 of the steam reformer 10. The product gas 36 may originate, for instance, by steam reforming spent black liquor and therefore may contain hydrogen sulfide.

As shown, the product gas stream 36 is fed to a scrubbing device or column 50. Not shown, the product gas stream may be cooled and/or may be used to generate or heat steam prior to entering the scrubbing column 50. In the scrubbing column 50, the product gas stream 36 is contacted with a sodium carbonate solution as generally disclosed in U.S. Pat. No.

5,059,404. In this embodiment, however, the solution is substantially saturated with sodium carbonate.

When the product gas stream 36 containing hydrogen sulfide is contacted with the sodium carbonate solution, the hydrogen sulfide is converted into a sodium sulfide, such as sodium bisulfide. Unfortunately, sodium bicarbonate also forms during the process. The presence of sodium bicarbonate can significantly increase calcination requirements later. According to the present invention, however, the sodium carbonate solution that contacts the product gas stream contains sodium carbonate at a concentration sufficient to cause any sodium bicarbonate that forms during the process to immediately precipitate. In particular, sodium carbonate is more soluble in water than sodium bicarbonate. Thus, using a substantially saturated sodium carbonate solution in the scrubbing column causes the sodium bicarbonate to precipitate.

The amount of sodium carbonate in the scrubbing solution and the temperature of the scrubbing solution may vary depending upon the particular application. In general, the scrubbing solution may be at a temperature of less than about 120 degrees F., such as from about 110 degrees F. to about 120 degrees F. Lower temperatures may be preferred in other applications. At the above temperatures, sodium carbonate may be contained in the scrubbing solution in an amount up to about 30% by weight, such as in an amount greater than about 15% by weight, and particularly in an amount greater than about 20% by weight.

As shown in FIG. 7, a substantially sulfur free product gas 52 exits the scrubbing column 50. The scrubbing fluid, on the other hand, is fed to a filtering device 54 in order to remove the precipitated sodium bicarbonate. The filtered solution, which contains sodium sulfides and sodium carbonate may then be reacted with calcium hydroxide to form sodium sulfide and sodium hydroxide, which may be recycled and used in the pulping process.

The precipitated sodium bicarbonate, on the other hand, is fed to a mixing tank 56 and dissolved in water. Sodium bicarbonate is added to the mixing tank 56 until a saturated sodium bicarbonate solution is formed. Once the solution is sufficiently saturated or while the saturated solution is being made, the solution is heated. For instance, the solution can be heated to a temperature of about 120 degrees F., which causes the sodium bicarbonate to convert into sodium carbonate and to release carbon dioxide. The sodium carbonate formed may, for instance, be used to form the scrubbing solution for use in the scrubbing column 50.

Through the above process, sodium bicarbonate is removed from the scrubbing solution reducing the calcination requirements.

Figure 8:
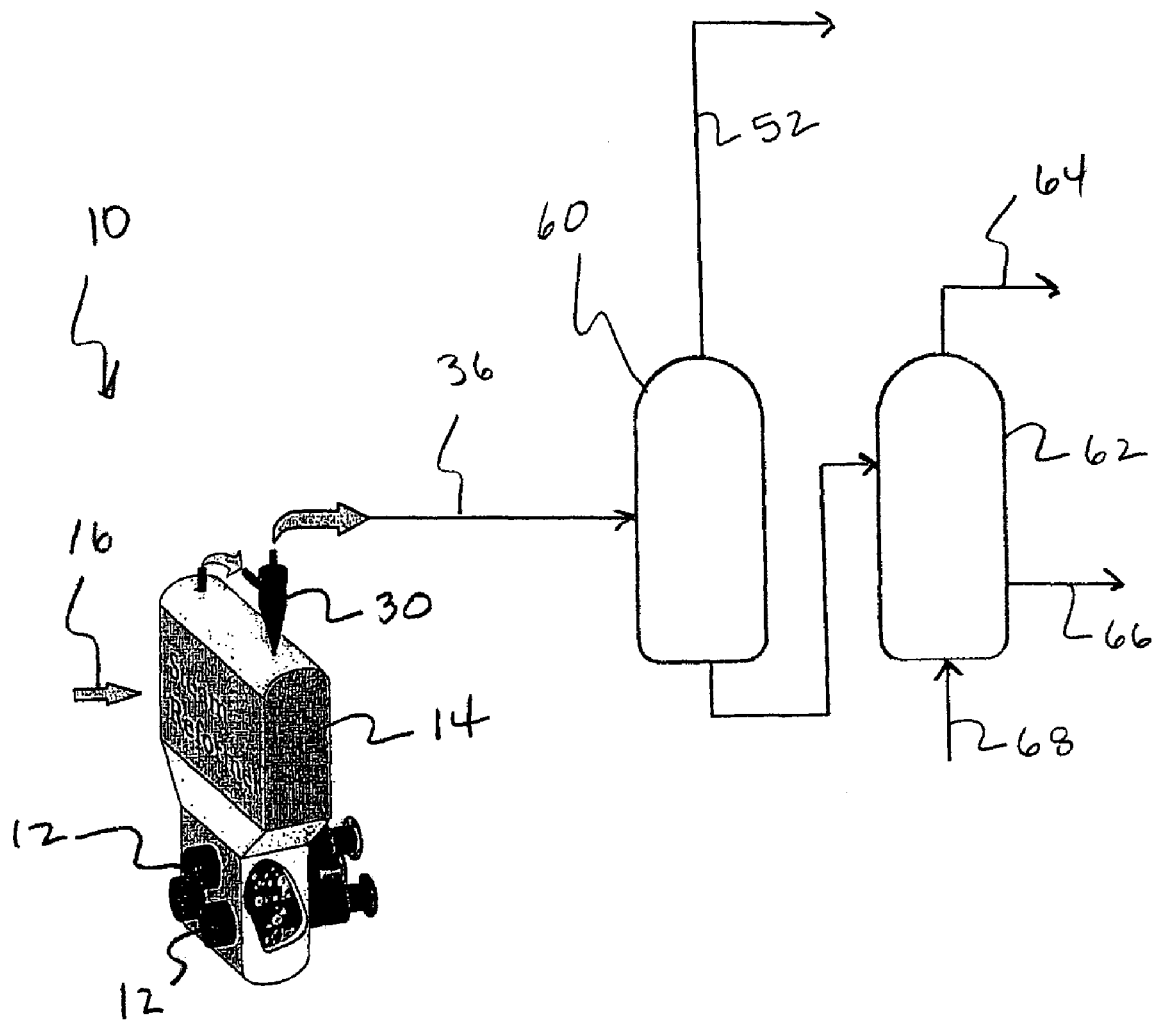
FIG. 8 is a diagram of still another embodiment of a thermochemical system made in accordance with the present invention.

An alternative embodiment of a system and method for reducing calcination requirements is shown in FIG. 8. In this embodiment, the product gas 36 is fed to a scrubbing column 60. In scrubbing column 60, instead of contacting a sodium carbonate solution, the product gas is contacted with a liquid containing a regenerative agent, such as an amine. The amine associates with hydrogen sulfide contained within the product gas stream. For example, in one embodiment, the amine absorbs and/or adsorbs the hydrogen sulfide and removes it from the product gas stream.

The amine that may be used in the process of the present invention may vary depending upon the components contained in the product gas stream. In general, an alkanol amine may be used, such as a tertiary amine. For instance, examples of amines include monoethanol amine, diethanol amine, or mixtures thereof. In one particular embodiment, methyldiethanol amine (MDEA) is used. Monodiethanol amine may be preferred in some applications due to its selectivity in absorbing hydrogen sulfide without absorbing great amounts of carbon oxides.

The amine may be present in an aqueous solution when contacting the product gas stream. For instance, the amine may be present in an amount from about 35% to about 50% by weight. When contacting the product gas stream, the amine solution may be heated to a temperature of from about 90 degrees F. to about 150 degrees F., such as from about 115 degrees F. to about 125 degrees F.

The hydrogen sulfide laden liquid containing the amine may then be fed to a stripping chamber 62 as shown in FIG. 8. In the stripping chamber, the liquid may be heated to a temperature sufficient to cause the hydrogen sulfide to disassociate with the amine and be released to form a gas stream 64. For instance, the liquid containing the amine may be heated to a temperature of from about 250 degrees F. to about 350 degrees F. in order for the liquid to release the hydrogen sulfide. Once the hydrogen sulfide is released, the liquid containing the amine is extracted from the stripping chamber 62 as shown at 66 and may be reused in the scrubbing column 60.

In one particular embodiment, the stripping chamber 62 includes an inlet 68 for receiving heated steam. The steam enters the stripping chamber 62 and directly contacts the hydrogen sulfide laden liquid. The steam heats the liquid in amounts sufficient for the hydrogen sulfide to be released. In one embodiment, the steam may be pressurized as it is fed to the stripping chamber. For instance, the steam may be at a pressure of about 50 psig.

By first removing the hydrogen sulfide from the product gas stream 36 using the regenerative agent, a gas stream 64 is produced containing hydrogen sulfide that has a much smaller mass flow rate than the product stream 62. Further, the partial pressure of carbon dioxide in the gas stream 64 is much lower than it is in the product gas stream 52. The gas stream 64 is thus more easily handled and manipulated for removing hydrogen sulfide.

In one embodiment, the gas stream 64 containing hydrogen sulfide is processed similar to the method described in conjunction with FIG. 7. In particular, the gas stream 64 is contacted with a substantially saturated sodium carbonate solution that causes sodium bicarbonate to precipitate. The sodium bicarbonate is filtered and then converted into sodium carbonate. Ultimately, sodium sulfide and sodium hydroxide are produced and may be reused in a paper pulping process.

Figure 9:
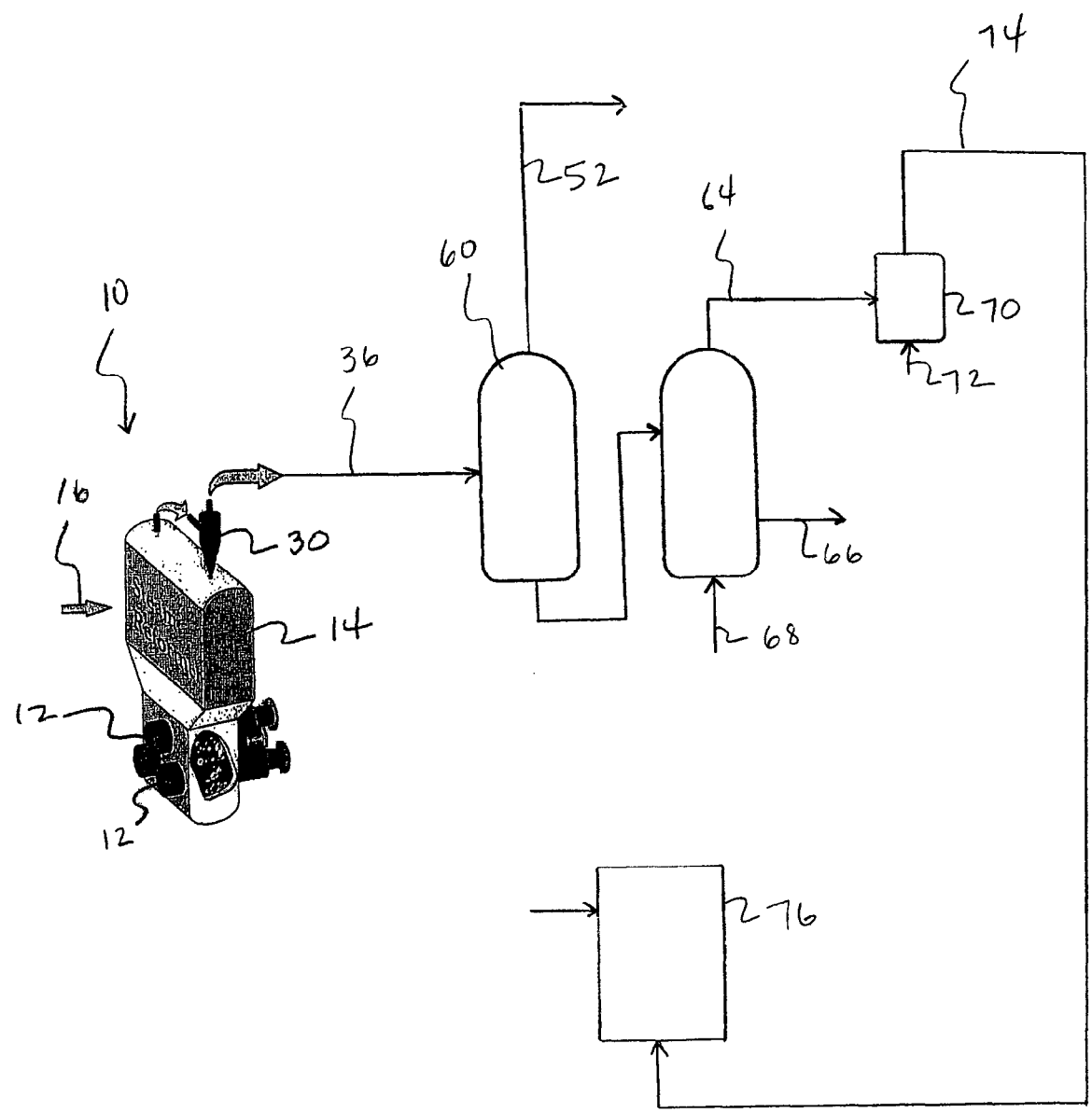
FIG. 9 is a diagram of another embodiment of a thermochemical system made in accordance with the present invention.

Instead of forming sodium sulfide, in another embodiment of the present invention, the hydrogen sulfide gas is used to produce sulfite crystals. For instance, a sulfite crystallization process is shown in FIG. 9. Repeat reference numerals have been used to indicate similar elements. As illustrated in this embodiment, the gas stream 64 containing sodium sulfide is first fed to a burner 70 and combined with an oxygen containing gas, such as air, through a port 72. The burner 70 may be, for instance, a duct burner, although any suitable furnace may be used. In the burner 70, the hydrogen sulfide reacts with oxygen to form sulfur dioxide which is released in a flue gas 74.

The flue gas 74 containing sulfur dioxide is then fed to a crystallization tank 76. The crystallization tank 76 contains a sodium carbonate solution. Sodium carbonate is contained in the solution in an amount near saturation, such as in an amount of at least 10% by weight, and particularly in an amount of at least 20% by weight. The flue gas stream 74 is bubbled through the sodium carbonate solution. The sodium carbonate solution is maintained at a temperature sufficient to cause sodium sulfite crystals to form. For example, in one embodiment, the sodium carbonate solution is at a temperature of from about 80 degrees F. to about 140 degrees F., such as at a temperature of from about 105 degrees F. to about 115 degrees F.

The sodium sulfite crystals may then be collected from the crystallization tank 76 and used as desired. For instance, sodium sulfite may be used in a paper pulping process. Sulfite crystals, however, have many other various diverse applications. For instance, sulfite crystals are sometimes used as an oxygen scavenger in high pressure boilers. Sulfites are also used as preservatives.

Of particular advantage, the sodium carbonate solution contained in the crystallization tank 76 may be formed by extracting solids from the fluidized bed 14 and feeding the solids to a dissolution tank. In fact, in many applications, the fluidized bed 14 will produce greater amounts of sodium carbonate than can be used in the crystallization tank 76. The remaining sodium carbonate not used in the crystallization tank may be, for instance, causticized in order to form caustic soda.

In still another embodiment of the present invention, calcination may be completely eliminated. In particular, in this embodiment, sodium carbonate formed during the process may be extracted from the fluidized bed and combined with high quality lime purchased from a commercial source. The sodium carbonate may react with the lime to form precipitated calcium carbonate and caustic soda. For instance, one process for forming calcium carbonate from sodium carbonate using lime is disclosed in U.S. Pat. No. 5,364,610 which is incorporated herein by reference.

Precipitated calcium carbonate has many uses in various fields. For instance, precipitated calcium carbonate is typically used as a filler in forming paper products. Calcium carbonate is also used in pharmaceuticals as well as in many other products and fields.

In fact, producing precipitated calcium carbonate may create more revenue than the cost of the high quality lime. Further, caustic soda is also produced during the process which may be used, for instance, in a pulping process.

In addition to extracting bed solids from the fluidized bed 14 and forming precipitated calcium carbonate, it should be understood that any sodium carbonate formed during the process may be reacted with lime to form precipitated calcium carbonate as desired.

Combined Cycle

The strategic attributes of the low temperature steam reforming recovery process are: 1) the ability to separate the sulfur from the alkali, 2) ability to process liquors having significant amounts of non-process elements (NPEs), and 3) the potential for enabling pulping with alkali other than sodium.

Figure 3:
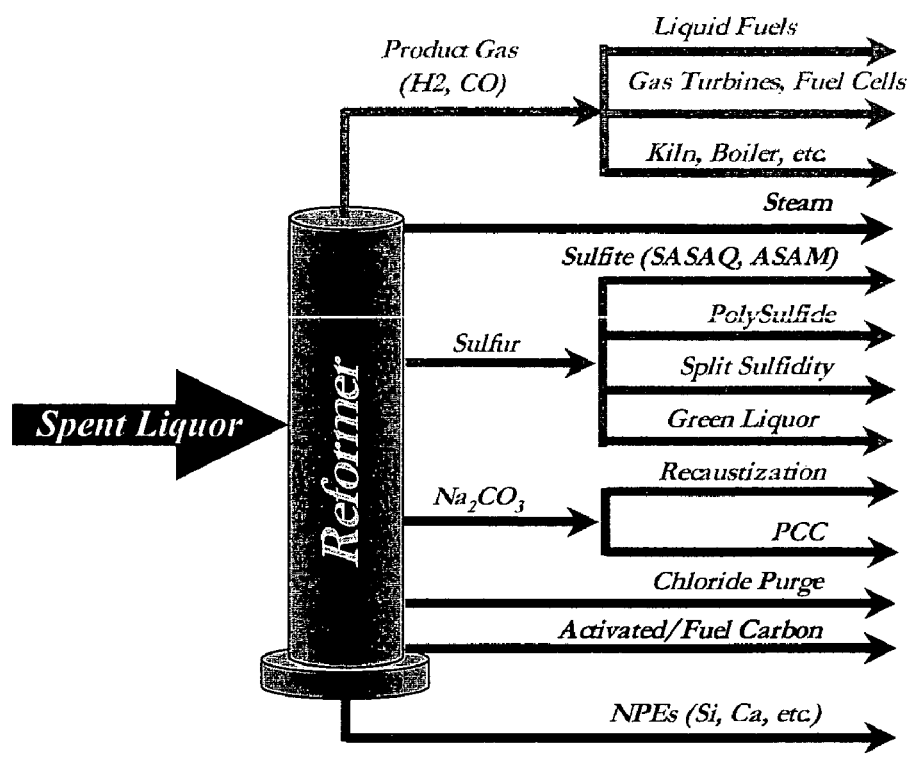
FIG. 3 illustrates some of the options for spent liquor recovery.

There are a number of feedstock recovery system configurations that are presented below, which exemplify the steam reformer integration in a pulp mill for power generation and CHP production (see FIG. 3).

It is well known that combined cycle power plants are much more efficient in generating power than steam cycle plants. Black liquor and biomass gasification is an enabling technology to implement combined cycle power generation using non-premium or renewable fuels. This facilitates superior and safe chemical recovery as well as efficient production of electricity.

In fact, the benefit of this high efficiency is that a mill could become electrically self-sufficient or even export surplus power. Investigations indicate that black liquor/biomass gasification combined cycle can not only meet a mill's power needs but can export about 100 MW of electricity.

Black liquor steam reforming co-generation enhances the U.S. Forest Product Industry's competitiveness in several ways. First, the process provides a more efficient and flexible means of recovering process chemicals for the pulping process. Generation of super sulfidity cooking liquors will offer the standard kraft pulp mill an opportunity for increased production yield. As more pulp is produced from the same amount of fiber, pulp production costs will decrease. Finally, more efficient power generation will improve the operation of the mill. Combustion of product gas will replace natural gas, and the mill will become a self-sufficient power generator. The additional fuel required to meet the mill's total electrical load would be obtained from biomass, a $CO_2$-neutral renewable fuel. In effect, the mill will reduce its reliance on fossil fuel and generate power from renewable fuels.

The steam reformer co-generation complex may comprise, for instance, an integrated combined-cycle facility; generating electrical power and providing steam for process use.

Figure 10:
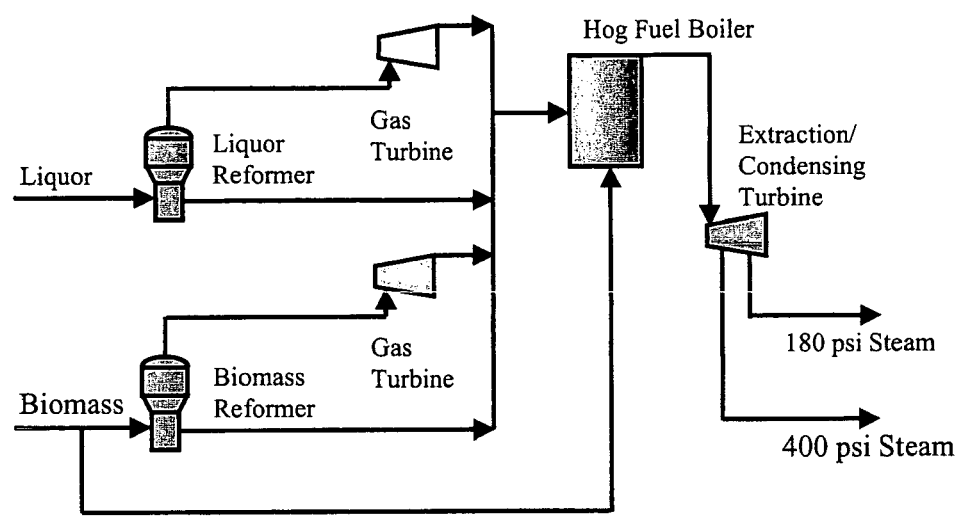
FIG. 10 is a schematic for one embodiment of a steam reforming co-generation process.

A simplified process flow diagram is presented in FIG. 10. In this configuration, a biomass gasifier is utilized to produce sufficient product gas to drive a gas turbine. The gas turbine exhaust is ducted to a new bottoming cycle boiler boosted by hog fuel for heat recovery and the steam produced will drive a steam turbine. Product gas is burned in efficient, low-$NO_x$ burners and in a combustion turbine, resulting in a very clean flue gas discharge. On the gasifier side, the undiluted product gas is scrubbed in a gas clean-up system, resulting in low emissions. The net result is that emissions of TRS, $SO_x$, $NO_x$, VOC, HCl and particulates are lower than those from traditional recovery boilers.

Black liquor is fed near the bottom of the indirectly heated fluidized bed steam reformer where it is rapidly heated by contacting the hot fluidized bed particles. The liquor dries nearly instantaneously and pyrolyzes, depositing carbonaceous material and inorganic matter on the bed particles. Steam used to fluidize the bed reacts with the carbon on the particles to produce carbon monoxide and hydrogen. These reactions are endothermic. Energy to support these reactions is provided by heat transfer through tubes immersed in the bed. The reformer may operate, in one embodiment, at a temperature of approximately 604 degrees C. (1,120 degrees F.) which is conducive to reasonably high (>95%) carbon conversion to gas. Sulfur present in the feed liquor is predominantly released as hydrogen sulfide and sodium is converted to sodium carbonate, which comprises the fluidized bed particles. The bed is drained to maintain the appropriate solids inventory within the reformer and dissolved to produce a sodium carbonate solution that is then causticized by reaction with lime to produce the sodium hydroxide solution required in the digesters.

Figure 11:
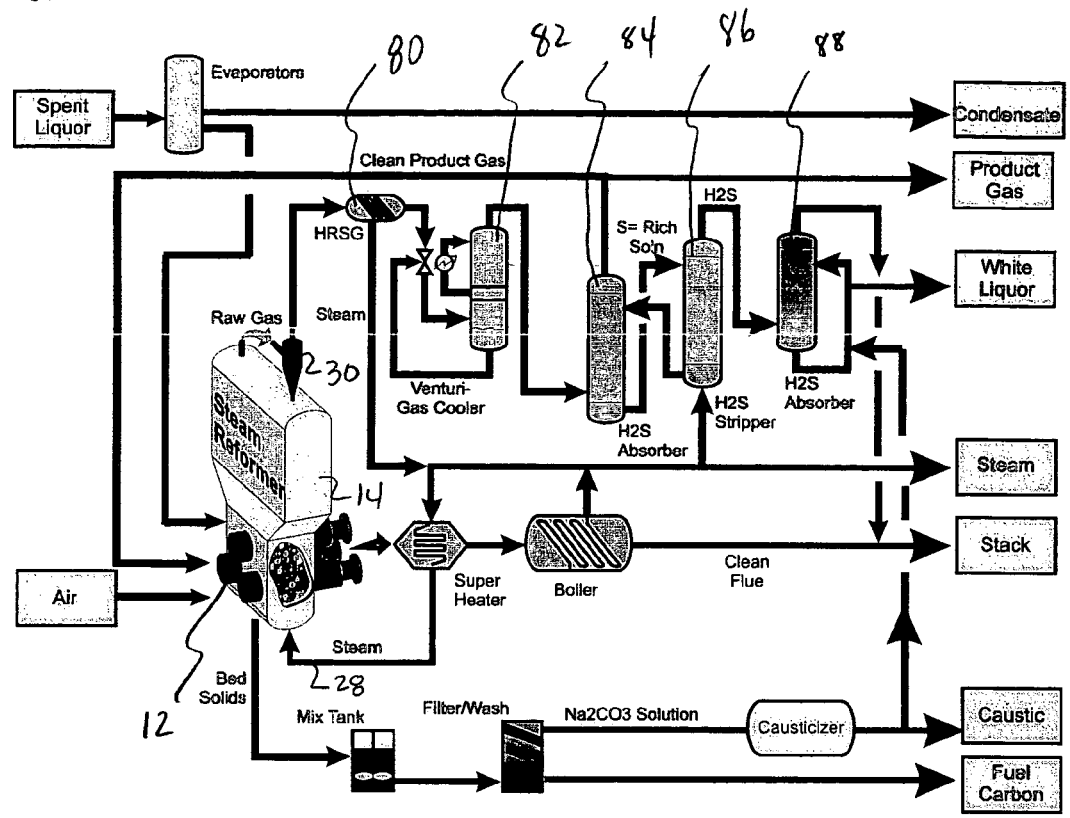
FIG. 11 is a schematic of another embodiment of a thermochemical system in accordance with the present invention.

A steam reformer configuration that may be used in the system illustrated in FIG. 10 is shown in FIG. 11. It should be understood that the system illustrated in FIG. 11 represents merely one embodiment of a steam reformer configuration that may be used in accordance with the present invention. The system shown in FIG. 11 is in no way intended to limit any embodiments or aspects of the present invention. The raw product gas leaving the reformer passes through a series of cyclones 30 to remove entrained solids, which are returned to the reformer. The gas then passes through a heat recovery steam generator 80 where a portion of the sensible heat is recovered to produce process steam. The gas then passes through a venturi scrubber 82 where it is contacted with recirculating water to remove fine solids and condense higher molecular weight hydrocarbons, if present. The gas is then cooled by direct contact with water to a temperature of about 52 degrees C. (125 degrees F.) to condense water vapor and to remove semi-volatile hydrocarbon vapors. The cooled gas is then contacted with an amine solution in an absorber 84 to remove hydrogen sulfide, producing a clean, medium Btu-content gas, a portion of which may be used as fuel in the pulse combustors (optional). Hydrogen sulfide is stripped from the amine solution in a stripping chamber 86 and recovered by contact with caustic in an absorber 88 produced from dissolved and filtered bed solids to produce the sodium sulfide used in the digesters.

The excess product gas is compressed and fired in a gas turbine. A biomass gasification facility provides increased power generating capacity. Since the product gas is being used to generate power, the amount of steam that can be produced via heat recovery is not sufficient to satisfy the mill's demand. Therefore, a bottoming cycle boiler boosted by hog fuel provides for additional steam generation. In order to reduce the cost and complexity of the integrated facility, the pulse combustor exhaust and the gas turbine exhaust are ducted to the bottoming cycle boiler for heat recovery instead of installing several smaller heat recovery steam generators. The steam produced via heat recovery and burning hog fuel is used in a double extraction, condensing turbine to supplement the gas turbine's power generation as well as to satisfy the steam demand of the mill.

Fuel Cell Integration

The integration of a Steam Reformer with a fuel cell is termed the thermoelectrochemical system. With biomass as input, the steam reformer generates a hydrogen-rich, medium-calorific value fuel gas that is electrochemically oxidized in the fuel cell to generate electricity. The fuel cell that is combined with the steam reformer may be, for instance, a phosphoric acid fuel cell, a molten carbonate fuel cell, or a solid oxide fuel cell, where the solid oxide fuel cell appears at the present time to be best suited for this application.

The following example is provided to demonstrate the ability of combining a steam reformer with a fuel cell.

Example No. 1

Figure 12:
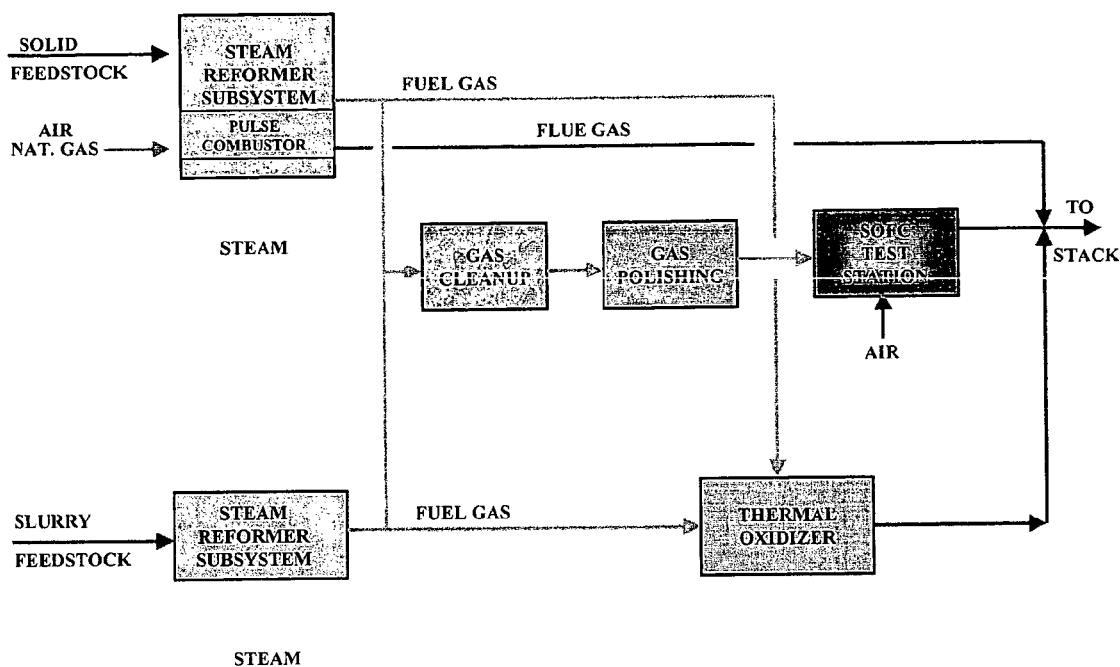
FIG. 12 is a schematic diagram of another embodiment of a thermochemical system in accordance with the present invention.

A prototype test system was assembled to experimentally establish the attributes of the thermoelectrochemical technology (see FIG. 12). The test system comprised two steam reformers, one capable of processing solid biomass and the other slurry-type biomass, a thermal oxidizer, a gas cleanup and polishing subsystem and a solid oxide fuel cell (SOFC) test station. A gas cleanup and polishing train was designed, assembled and integrated to screen multiple solvents for acid gas absorption and different sorbents for gas polishing to comply with the SOFC tolerance limits for impurities (see Table I).

Many tests were conducted with solid biomass as well as with black liquor to debug the operation of the gas cleanup and polishing train. Several modifications to the train ensured exit fuel gas of high quality.

During the black liquor characterization trials, a portion of the product gas was routed through the gas cleanup train to the fuel cells. Table II indicates the fuel gas composition data for the test. $CO_2$ was used as the instrumentation purge gas and nitrogen was used as GC calibration tracer. Material and energy balance calculations for commercial scale systems indicate the fuel gas HHV to be in the 9.3-11.2 $MJ/Nm^3$ dry (250-300 Btu/dry scf) range for different liquors.

The caustic scrubbing column was very effective in capturing $H_2S$ and mercaptans and in reducing the $CO_2$ content of the fuel gas from about 33 to 22 percent. The HHV improved to 10.3 $MJ/Nm^3$ dry (276 Btu/dscf). This was a low sulfur black liquor (~0.1% by weight in the black liquor solids), and therefore, the caustic was itself effective in dropping out the sulfur contaminants and there was minimal demand on the activated carbon. Table III indicates that the fuel gas at the gas cleanup train exit met all the SOFC tolerance limits for impurities. The fuel gas composition stayed relatively constant during the integrated test operations. Hydrogen was the major constituent (~70% by volume) followed by carbon dioxide (~20%) and others (CO, CxHy and $N_2$, all together ~10%).

Black liquor was steam reformed at 877 K (1,120 degrees F.) and a slipstream of clean syngas rich in hydrogen (>65% by volume) with a higher heating value (HHV) of 10.3 $MJ/Nm^3$ dry (276 Btu/dscf) was metered to the SOFC. The SOFC operated at 1,270 K (1,827° F.) and produced a net 2.61V and 62.2 A DC or an equivalent of 162 W power. Similarly, wood waste was steam reformed at 1,073 K (1,472 degrees F.), and a slipstream of clean syngas (with a 45% by volume hydrogen content) and a HHV of 13.5 $MJ/Nm^3$ dry (361 Btu/dscf) was metered to the SOFC to generate power. The SOFC flue gas emissions were low, as expected.

The SOFC stack performed as well with syngas as with hydrogen. The design stack output was 160 W and the actual performance not only matched but also actually exceeded the design value slightly.

TABLE I

SOFC Fuel Cell Tolerance Limit for Impurities

| Impurity | Limit |
|---|---|
| $H_2S$ | 0.1 ppmv |
| $NH_3$ | 5,000 ppmv |
| HCl | 1 ppmv |
| Particulates | 0.1 kg/m$^3$ |

TABLE II

Fuel Gas Composition

| | | By Volume, % | |
|---|---|---|---|
| Component | Formula | Baseline No Scrubbing | Caustic Scrubbing |
| Hydrogen | $H_2$ | 58.74 | 69.25 |
| Nitrogen | $N_2$ | 2.87 | 2.39 |
| Methane | $CH_4$ | 0.74 | 0.93 |
| Carbon Monoxide | CO | 3.02 | 3.73 |
| Carbon Dioxide | $CO_2$ | 33.30 | 22.07 |
| Ethylene | $C_2H_4$ | 0.60 | 0.84 |
| Ethane | $C_2H_6$ | 0.43 | 0.50 |
| Acetylene | $C_2H_2$ | 0.01 | 0.01 |
| Propylene | $C_3H_6$ | 0.29 | 0.28 |
| Propane | $C_3H_8$ | 0.00 | 0.00 |
| HHV, MJ/dry Nm$^3$ | | 8.65 | 10.27 |
| HHV, Btu/dry scf | | 232 | 276 |

TABLE III

Contaminants in the Fuel Gas

| | | By Volume, (ppmv) | |
|---|---|---|---|
| Component | Formula | Baseline No Scrubbing | Caustic Scrubbing |
| Hydrogen sulfide Sampling Port | $H_2S$ | | |
| B | | 280 | <0.2^ |
| C | | | <0.2^ |
| Mercaptan Sampling Port | $CH_3SH$ | | |
| B | | >100* | <0.5^ |
| C | | | <0.5^ |
| Ammonia Sampling Port | $NH_3$ | | |
| B | | <5^ | |
| Hydrogen Chloride Sampling Port | HCl | | |
| B | | <1^ | |

These and other modifications and variations to the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention.

What is claimed:

1. A process for producing a product gas having heat or fuel value comprising:
   feeding a carbonaceous material to a fluidized bed located in a first apparatus, the fluidized bed containing particles suspended in a fluid medium, the fluidized bed including a top portion and a bottom portion, the bottom portion being in communication with a solids collection reservoir located below the bottom portion and separate from the first apparatus in which the fluidized bed is located;
   indirectly heating the fluidized bed with a pulse combustion device, a portion of the carbonaceous material fed to the fluidized bed being gasified to form a product gas stream;
   receiving bed solids from the fluidized bed directly into the solids collection reservoir; and
   feeding a gaseous medium through the solids collection reservoir and into the bottom portion of the fluidized bed, the gaseous medium comprising an oxygen-containing gas, wherein:
   the solids collection reservoir is maintained at a higher temperature than the fluidized bed; and
   a first portion of carbon particles within the bed solids received into the solids collection reservoir is oxidized and a second portion of the carbon particles is endothermically converted to a gas.

2. A process as defined in claim 1, wherein the fluid medium in the fluidized bed comprises steam.

3. A process as defined in claim 1, wherein the fluidized bed is heated to a temperature of less than about 1150 degrees F.

4. A process as defined in claim 1, wherein the fluidized bed is heated to a temperature of less than about 1100 degrees F.

5. A process as defined in claim 1, wherein the product gas stream is fed to a filtering device for filtering solids entrained in the product gas stream, the filtered solids being recirculated back to the fluidized bed.

6. A process as defined in claim 1, wherein the gaseous medium fed through the solids collection reservoir contains oxygen in a stoichiometric amount less than about 50%.

7. A process as defined in claim 1, wherein the carbonaceous material comprises a black liquor.

8. A process as defined in claim 2, wherein at least a portion of the carbonaceous material fed to the fluidized bed is steam reformed to form the product gas stream.

9. A process as defined in claim 7, wherein the particles suspended in the fluidized bed comprise sodium carbonate.

10. A process as defined in claim 1, wherein the particles suspended in the fluidized bed comprise sodium carbonate and the fluidizing medium comprises steam, the carbonaceous material being fed to the fluidized bed comprising black liquor, a majority of the black liquor being steam reformed in the fluidized bed.

11. A process for producing a product gas having heat or fuel value comprising:
    feeding a carbonaceous material to a fluidized bed located in a first apparatus, the fluidized bed containing particles suspended in a fluid medium, the fluidized bed including a top portion and a bottom portion, the bottom portion being in communication with a solids collection reservoir located below the bottom portion and separate from the first apparatus in which the fluidized bed is located;
    indirectly heating the fluidized bed with a pulse combustion device, a portion of the carbonaceous material fed to the fluidized bed being gasified to form a product gas stream;
    receiving bed solids from the fluidized bed directly into the solids collection reservoir; and
    feeding a gaseous medium through the solids collection reservoir and into the bottom portion of the fluidized bed, the gaseous medium comprising an oxygen-containing gas and gasifying carbon particles within the bed solids received into the solids collection reservoir, wherein:
    the solids collection reservoir is maintained at a higher temperature than the fluidized bed.

12. A process as defined in claim 11, wherein the fluid medium in the fluidized bed comprises steam.

13. A process as defined in claim 12, wherein at least a portion of the carbonaceous material fed to the fluidized bed is steam reformed to form the product gas stream.

14. A process as defined in claim 11, wherein the fluidized bed is heated to a temperature of less than about 1150 degrees F.

15. A process as defined in claim 11, wherein the fluidized bed is heated to a temperature of less than about 1100 degrees F.

16. A process as defined in claim 11, wherein the product gas stream is fed to a filtering device for filtering solids entrained in the product gas stream, the filtered solids being recirculated back to the fluidized bed.

17. A process as defined in claim 11, wherein the gaseous medium fed through the solids collection reservoir contains oxygen in a stoichiometric amount less than about 50%.

18. A process as defined in claim 11, wherein a first portion of carbon particles within the bed solids received into the solids collection reservoir is oxidized and a second portion of the carbon particles is endothermically converted to a gas.

19. A process as defined in claim 11, wherein the carbonaceous material comprises a black liquor.

20. A process as defined in claim 19, wherein the particles suspended in the fluidized bed comprise sodium carbonate.

21. A process as defined in claim 11, wherein the particles suspended in the fluidized bed comprise sodium carbonate and the fluidizing medium comprises steam, the carbonaceous material being fed to the fluidized bed comprising black liquor, a majority of the black liquor being steam reformed in the fluidized bed, and wherein a first portion of the carbon particles within the bed solids received into the solids collection reservoir is oxidized and a second portion of the carbon particles is steam reformed.

22. A process for producing a product gas having heat or fuel value comprising:
    feeding a carbonaceous material to a fluidized bed located in a first apparatus, the fluidized bed containing particles suspended in a fluid medium, the fluidized bed including a top portion and a bottom portion, the bottom portion being in communication with a solids collection reservoir located below the bottom portion and separate from the first apparatus in which the fluidized bed is located;
    indirectly heating the fluidized bed with a pulse combustion device, a portion of the carbonaceous material fed to the fluidized bed being gasified to form a product gas stream;
    receiving bed solids from the fluidized bed directly into the solids collection reservoir; and
    feeding a gaseous medium through the solids collection reservoir and into the bottom portion of the fluidized bed, wherein:
    the solids collection reservoir is maintained at a higher temperature than the fluidized bed;
    the particles suspended in the fluidized bed comprise sodium carbonate;
    the fluid medium comprises steam and an oxygen-containing gas;
    the carbonaceous material being fed to the fluidized bed comprises black liquor, a majority of the black liquor being steam reformed in the fluidized bed, and
    a first portion of carbon particles within the bed solids received into the solids collection reservoir is oxidized, and a second portion of the carbon particles is steam reformed.

23. A process as defined in claim 22, wherein the fluidized bed is heated to a temperature of less than about 1150 degrees F.

24. A process as defined in claim 22, wherein the fluidized bed is heated to a temperature of less than about 1100 degrees F.

25. A process as defined in claim 22, wherein the product gas stream is fed to a filtering device for filtering solids entrained in the product gas stream, the filtered solids being recirculated back to the fluidized bed.

26. A process as defined in claim 22, wherein the gaseous medium fed through the solids collection reservoir contains oxygen in a stoichiometric amount less than about 50%.

27. A process as defined in claim 1, further comprising:
    introducing steam via a port directly into the fluidized bed, to serve as the fluidizing medium.

28. A process as defined in claim 11, further comprising:
    introducing steam via a port directly into the fluidized bed to serve as the fluidizing medium.

29. A process as defined in claim 22, further comprising:
    introducing steam via a port directly into the fluidized bed to serve as the fluidizing medium.

30. A process as defined in claim 1, wherein the solids collection reservoir is configured as a fixed bed.

31. A process as defined in claim 11, wherein the solids collection reservoir is configured as a fixed bed.

32. A process as defined in claim 22, wherein the solids collection reservoir is configured as a fixed bed.

* * * * *